US011165095B2

(12) United States Patent
Shimizu et al.

(10) Patent No.: US 11,165,095 B2
(45) Date of Patent: Nov. 2, 2021

(54) SOLID-STATE BATTERY, BATTERY PACK, ELECTRIC MOTOR VEHICLE, POWER STORAGE SYSTEM, ELECTRIC TOOL, AND ELECTRONIC DEVICE

(71) Applicant: Murata Manufacturing Co., Ltd., Nagaokakyo (JP)

(72) Inventors: Keisuke Shimizu, Nagaokakyo (JP); Masamitsu Suzuki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 259 days.

(21) Appl. No.: 16/580,001

(22) Filed: Sep. 24, 2019

(65) Prior Publication Data

US 2020/0020974 A1    Jan. 16, 2020

Related U.S. Application Data

(63) Continuation of application No. PCT/JP2018/015956, filed on Apr. 18, 2018.

(30) Foreign Application Priority Data

May 1, 2017   (JP) .............................. JP2017-091093

(51) Int. Cl.
*H01M 10/0525*   (2010.01)
*H01M 10/0565*   (2010.01)
*H01M 10/0585*   (2010.01)

(52) U.S. Cl.
CPC ... *H01M 10/0525* (2013.01); *H01M 10/0565* (2013.01); *H01M 10/0585* (2013.01); *H01M 2220/20* (2013.01)

(58) Field of Classification Search
CPC ......... H01M 10/0525; H01M 10/0565; H01M 10/0585
See application file for complete search history.

(56) References Cited

U.S. PATENT DOCUMENTS 9,190,652 B2   11/2015   Hayashi et al.
9,373,869 B2    6/2016   Tanaka
(Continued)

FOREIGN PATENT DOCUMENTS

JP   2012038425 A    2/2012
JP   2013157334    *  8/2013
(Continued)

OTHER PUBLICATIONS

International Search Report issued in PCT/JP2018/015956, dated Jul. 24, 2018.
(Continued)

*Primary Examiner* — Jayne L Mershon
(74) *Attorney, Agent, or Firm* — Arent Fox LLP

(57) ABSTRACT

A solid-state battery that includes a cathode layer which occludes and discharges an electrode reactant ion, an anode layer which occludes and discharges the electrode reactant ion and partially faces the cathode layer, and a solid electrolyte layer between the cathode layer and the anode layer and including a high ion conductivity portion in a first region in which the cathode layer and the anode layer face each other, and a low ion conductivity portion facing the cathode layer in a second region in which the cathode layer and the anode layer do not face each other.

20 Claims, 14 Drawing Sheets

(56) References Cited

U.S. PATENT DOCUMENTS

| | | | | |
|---|---|---|---|---|
| 2010/0129699 A1* | 5/2010 | Mikhaylik | ............ | H02J 7/0068 429/50 |
| 2013/0149593 A1* | 6/2013 | Hayashi | .............. | H01M 10/052 429/160 |
| 2014/0079992 A1* | 3/2014 | Tanaka | .............. | H01M 10/0418 429/210 |
| 2017/0214026 A1* | 7/2017 | Ueda | ........................ | H01M 4/13 |

FOREIGN PATENT DOCUMENTS

| | | | |
|---|---|---|---|
| JP | 2013157334 A | 8/2013 | |
| JP | 2013168254 A | 8/2013 | |
| JP | 2016001600 A | 1/2016 | |
| WO | 2012020699 A1 | 2/2012 | |
| WO | 2012164642 A1 | 12/2012 | |
| WO | 2016051645 A1 | 4/2016 | |

OTHER PUBLICATIONS

Written Opinion of the International Searching Authority issued in PCT/JP2018/015956, dated Jul. 24, 2018.

* cited by examiner

SOLID-STATE BATTERY, BATTERY PACK, ELECTRIC MOTOR VEHICLE, POWER STORAGE SYSTEM, ELECTRIC TOOL, AND ELECTRONIC DEVICE

CROSS REFERENCE TO RELATED APPLICATIONS

The present application is a continuation of International application No. PCT/JP2018/015956, filed Apr. 18, 2018, which claims priority to Japanese Patent Application No. 2017-091093, filed May 1, 2017, the entire contents of each of which are incorporated herein by reference.

FIELD OF THE INVENTION

The present technology relates to a solid-state battery including a solid electrolyte layer, and a battery pack, an electric motor vehicle, a power storage system, an electric tool, and an electronic device which use the solid-state battery.

BACKGROUND OF THE INVENTION

As various electronic devices such as mobile phones and the like are widely used, there has been a demand for miniaturization, weight reduction, and life extension of such electronic devices. In this regard, research and development has been carried out actively on a chargeable and dischargeable battery as a power supply.

As the battery, instead of a battery which uses a liquid-state electrolyte (electrolytic solution), a battery which uses a solid-state electrolyte (solid electrolyte), has attracted attention. This is because a problem such as leakage or the like, which is specific to batteries in the liquid state, does not occur in the solid-state battery.

Application of the solid-state battery is not limited to the electronic devices described above, and other applications are possible. Examples of other applications include application to a battery pack which is detachably mounted on an electronic device or the like, an electric motor vehicle such as an electric car or the like, a power storage system such as a domestic power generator or the like, and an electric tool such as an electric drill or the like.

The solid-state battery includes a solid electrolyte layer together with a cathode layer and an anode layer. Since a configuration of the solid-state battery greatly affects battery characteristics, various studies have been made on the configuration of the solid-state battery.

A solid-state battery has been proposed in which a cathode layer and an anode layer are alternately laminated with a solid electrolyte layer interposed therebetween (for example, see Patent Document 1).

Patent Document 1: Japanese Patent Application Laid-Open No. 2016-001600

SUMMARY OF THE INVENTION

In addition to charge and discharge performance, safety is also important in a solid-state battery. However, since the safety of the solid-state battery is not yet sufficient, there is room for improvement.

The present invention has been made to solve the above problems, and an object of the present invention is to provide a solid-state battery, a battery pack, an electric motor vehicle, a power storage system, an electric tool, and an electronic device which can improve safety.

A solid-state battery according to an embodiment of the present invention includes a cathode layer which occludes and discharges an electrode reactant ion; an anode layer which occludes and discharges the electrode reactant ion and partially faces the cathode layer; and a solid electrolyte layer between the cathode layer and the anode layer and including a high ion conductivity portion in a first region in which the cathode layer and the anode layer face each other, and a low ion conductivity portion facing the cathode layer in a second region in which the cathode layer and the anode layer do not face each other.

Another solid-state battery according to the embodiment of the present technology includes a cathode terminal; an anode terminal spaced apart from the cathode terminal; a cathode layer which extends from the cathode terminal to the anode terminal so as to be electrically connected to the cathode terminal and electrically isolated from the anode terminal, and occludes and discharges an electrode reactant ion; an anode layer which extends from the anode terminal to the cathode terminal so as to be electrically connected to the anode terminal and electrically isolated from the cathode terminal, partially faces the cathode layer, and occludes and discharges the electrode reactant ion; and a solid electrolyte layer between the cathode layer and the anode layer in a first region in which the cathode layer and the anode layer face each other and in a second region in which the cathode layer and the anode layer do not face each other and including a high ion conductivity portion in the first region, and a low ion conductivity portion in the second region.

Each of a battery pack, an electric motor vehicle, a power storage system, an electric tool, and an electronic device of an embodiment of the present invention includes a solid-state battery, and the solid-state battery has the same configuration as that of the solid-state battery of the above-described embodiments.

In the solid-state battery of the embodiments of the present invention, it is possible to improve safety of the solid-state battery.

Note that the effect described herein is not necessarily limited, and may be any one of effects described in the present technology.

DETAILED DESCRIPTION OF THE INVENTION

Hereinafter, an embodiment of the present invention will be described in detail with reference to the drawings. Note that descriptions will be provided in the following order.

1. Solid-State Battery
1-1. Configuration
1-2. Property and Detailed Configuration of Solid Electrolyte Layer
1-3. Operation
1-4. Manufacturing Method
1-5. Action and Effect
1-6. Modified Example
2. Use of Solid-State Battery
2-1. Battery Pack (Single Battery)
2-2. Battery Pack (Assembled Battery)
2-3. Electric Motor Vehicle
2-4. Power Storage System
2-5. Electric Tool
3. Application Example of Solid-State Battery 1. Solid-State Battery A solid-state battery according to an embodiment of the present technology will be described with reference to the drawings.

The solid-state battery described here is a battery which includes an electrolyte in a solid state and in which battery capacity is realized by occluding and releasing an electrode reactant ion.

The "electrode reactant ion" is an ion relating to an electrode reaction (i.e., a charge or discharge reaction). The type of electrode reactant ion is not particularly limited, and examples of the electrode reactant ion include an ion of an alkali metal element. Hereinafter, an example where the electrode reactant ion is a lithium ion will be described.

1-1. Configuration

First, a configuration of the solid-state battery will be described.

[Overall Configuration]

Figure 1:
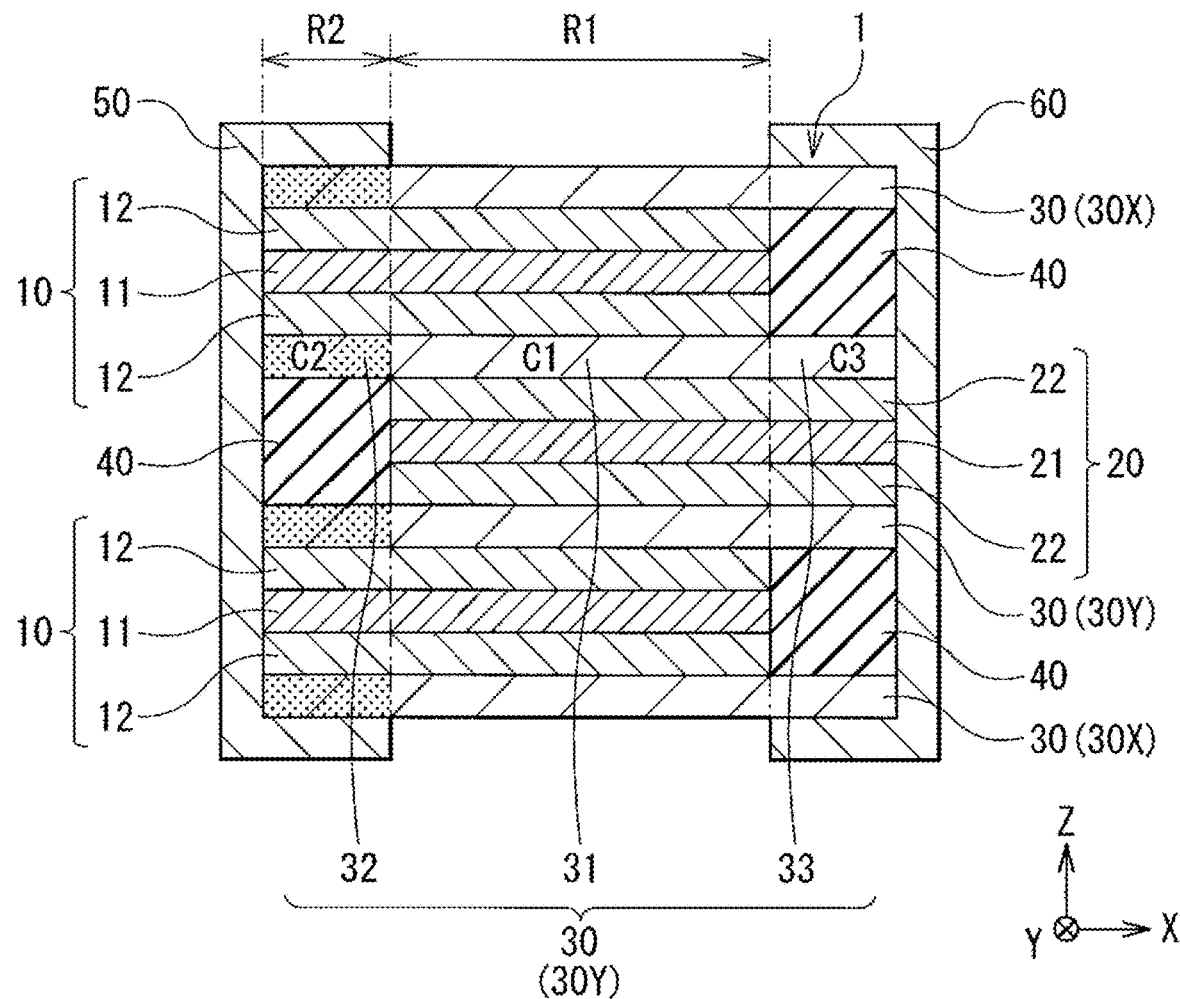
FIG. 1 is a sectional view illustrating a configuration of a solid-state battery according to an embodiment of the present technology.

FIG. 1 illustrates a sectional configuration of the solid-state battery. As illustrated in FIG. 1, the solid-state battery includes, for example, a laminate 1 including a cathode layer 10, an anode layer 20, a solid electrolyte layer 30, and an insulating layer 40, and a cathode terminal 50 and an anode terminal 60 which are attached to the laminate 1.

Hereinafter, directions will be described based on an X axis and a Z axis illustrated in FIG. 1. In detail, an X axis direction (left-right direction) is denoted as a "width direction", and a Z axis direction (top-bottom direction) is denoted as a "height direction". In FIG. 1, a left side and a right side in the width direction are denoted as "left" and "right", respectively, and an upper side and a lower side in the height direction are denoted as "top" and "bottom", respectively.

[Laminate]

The laminate 1 is, for example, a structure in which the cathode layer 10, the anode layer 20, the solid electrolyte layer 30, and the insulating layer 40 are laminated in the height direction.

The number of cathode layers 10 and the number of anode layers 20 are not particularly limited. That is, the number of cathode layers 10 may be one only, or may be two or more. Similarly, the number of anode layers 20 may be one only, or two or more.

However, the lowermost layer in the laminate 1 is, for example, the solid electrolyte layer 30, not the cathode layer 10 or the anode layer 20. Further, the uppermost layer in the laminate 1 is, for example, the solid electrolyte layer 30, not the cathode layer 10 or the anode layer 20.

FIG. 1 illustrates, for example, a case where the number of cathode layers 10 is two and the number of anode layers 20 is one, in order to simplify the illustration. In this case, for example, one anode layer 20 is disposed between two cathode layers 10, and the cathode layers 10 and the anode layer 20 are spaced apart from each other while having each of the solid electrolyte layers 30 interposed therebetween.

[Cathode Layer]

The cathode layer 10 is preferably an electrode which occludes and discharges a lithium ion which is the electrode reactant ion.

The cathode layer 10, for example, extends in the width direction. The cathode layer 10 is in contact with the cathode terminal 50 and is thus electrically connected to the cathode terminal 50, and is spaced apart from the anode terminal 60 while having the insulating layer 40 interposed therebetween and is thus electrically separated from the anode terminal 60.

Further, the cathode layer 10 includes, for example, a cathode current collector layer 11 and a cathode active material layer 12 provided on the cathode current collector layer 11. The cathode active material layer 12 may be, for example, provided on only one surface of the cathode current collector layer 11 or may be provided on both surfaces of the cathode current collector layer 11. FIG. 1 illustrates, for example, a case where the cathode active material layers 12 are provided on both surfaces of the cathode current collector layer 11.

Note that the cathode current collector layer 11 may be, for example, a single layer or a multilayer. Similarly, the cathode active material layer 12 may be, for example, a single layer or a multilayer.

(Cathode Current Collector Layer)

The cathode current collector layer 11 contains, for example, one, or two or more types of conductive materials. However, the cathode current collector layer 11 may contain, for example, one, or two or more types of additives such as a cathode current collector binder, a solid electrolyte, and the like, in addition to the conductive materials described above.

Examples of the conductive material include a carbon material, a metal material, and the like. Specific examples of the carbon material include graphite, carbon nanotubes, and the like. Specific examples of the metal material include copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), palladium (Pd), and the like. However, the metal material may also be an alloy of two or more of the specific examples of the metal material described above.

Details of the cathode current collector binder are the same as, for example, details of a cathode binder to be described later. However, the type of cathode current collector binder may be the same as or different from, for example, the type of cathode binder.

Note that the cathode current collector layer 11 may contain, for example, a solid electrolyte as described above. Only one type of solid electrolyte may be contained, or two or more types of solid electrolytes may be contained. Details of the solid electrolyte will be described later.

(Cathode Active Material Layer)

The cathode active material layer 12 contains, for example, a cathode active material which can occlude and discharge a lithium ion. However, the cathode active material layer 12 may contain, for example, one, or two or more types of additives such as a cathode binder, a cathode conductive agent, a solid electrolyte, and the like, in addition to the cathode active material described above.

The cathode active material includes one, or two or more types of cathode materials which can occlude and discharge a lithium ion. This is because a high energy density can be obtained by using a lithium ion as the electrode reactant ion.

The cathode material which can occlude and discharge a lithium ion is, for example, a lithium-containing compound. The term "lithium-containing compound" is a generic term for a compound containing lithium (Li) as a constituent element.

The type of lithium compound is not particularly limited, and examples of the lithium compound include a lithium transition metal composite oxide, a lithium transition metal phosphate compound, and the like. The term "lithium transition metal composite oxide" is a generic term for an oxide containing lithium and one, or two or more types of transition metal elements as constituent elements, and the term "lithium transition metal phosphate compound" is a generic term for a phosphate compound containing lithium and one, or two or more types of transition metal elements as constituent elements.

The types of transition metal elements described above are not particularly limited, and cobalt (Co), nickel (Ni), manganese (Mn), iron (Fe), and the like are also preferable. This is because a high voltage can be obtained.

The lithium transition metal composite oxide is, for example, a compound represented by $Li_xM1O_2$, a compound represented by $Li_yM2O_4$, and the like. The lithium transition metal phosphate compound is, for example, a compound represented by $Li_zM3PO_4$ and the like. However, each of M1 to M3 is one, or two or more types of transition metal elements. Further, a value for each of x to z is optional.

Specific examples of the lithium transition metal composite oxide include $LiCoO_2$, $LiNiO_2$, $LiVO_2$, $LiCrO_2$, $LiMn_2O_4$, and the like. Specific examples of the lithium transition metal phosphate compound include $LiFePO_4$, $LiCoPO_4$, and the like.

Note that the cathode material which can occlude and discharge a lithium ion may be, for example, a material other than the lithium-containing compound. Examples of the material other than the lithium-containing compound include an oxide, a disulfide, a chalcogenide, a conductive polymer, and the like. Specific examples of the oxide include titanium oxide, vanadium oxide, manganese dioxide, and the like. Specific examples of the disulfide include titanium disulfide, molybdenum sulfide, and the like. Specific examples of the chalcogenide include niobium selenide, and the like. Specific examples of the conductive polymer include sulfur, polyaniline, polythiophene, and the like.

The cathode binder binds mainly the cathode active material and the like. The cathode binder contains, for example, one, or two or more of a synthetic rubber, a polymer material, and the like. Specific examples of the synthetic rubber include a styrene-butadiene-based rubber, a fluorine-based rubber, ethylene propylene diene, and the like. Specific examples of the polymer material include polyvinylidene fluoride, polyimide, an acrylic resin, and the like.

The cathode conductive agent mainly improves conductivity of the cathode active material layer 12. The cathode conductive agent contains, for example, one, or two or more of a carbon material, a metal oxide, a conductive polymer, and the like. Specific examples of the carbon material include graphite, carbon black, acetylene black, Ketjen black, carbon fiber, and the like. Specific examples of the metal oxide include tin oxide and the like. Specific examples of the conductive polymer include sulfur, polyaniline, polythiophene, and the like. However, the cathode conductive agent may be formed of a material other than those described above as long as the material has conductivity.

Note that the cathode active material layer 12 may contain, for example, a solid electrolyte as described above. Only one type of solid electrolyte may be contained, or two or more types of solid electrolytes may be contained. Details of the solid electrolyte will be described later.

[Anode Layer]

The anode layer 20 is the other electrode which occludes and discharges a lithium ion.

The anode layer 20, for example, extends in the width direction similarly to the cathode layer 10. The anode layer 20 is in contact with the anode terminal 60 and is thus electrically connected to the anode terminal 60, and is spaced apart from the cathode terminal 50 while having the insulating layer 40 interposed therebetween and is thus electrically separated from the cathode terminal 50.

Further, the anode layer 20 includes, for example, an anode current collector layer 21 and an anode active material layer 22 provided on the anode current collector layer 21. The anode active material layer 22, for example, may be provided on only one surface of the anode current collector layer 21 or may be provided on both surfaces of the anode current collector layer 21. FIG. 1 illustrates, for example, a case where the anode active material layers 22 are provided on both surfaces of the anode current collector layer 21.

Note that the anode current collector layer 21 may be, for example, a single layer or a multilayer. Similarly, the anode active material layer 22 may be, for example, a single layer or a multilayer.

(Anode Current Collector Layer)

A configuration of the anode current collector layer 21 is, for example, the same as that of the cathode current collector layer 11. That is, the anode current collector layer 21 contains one, or two or more types of conductive materials, and may contain one, or two or more types of additives such as an anode current collector binder, a solid electrolyte, and the like in addition to the conductive material. However, a configuration of the anode current collector layer 21 may be the same as or different from, for example, that of the cathode current collector layer 11.

Details of the anode current collector binder are the same as, for example, details of the cathode binder. However, the type of anode current collector binder may be the same as or different from, for example, the type of cathode binder.

Note that the anode current collector layer 22, for example, may include a solid electrolyte as described above. Only one type of solid electrolyte may be contained, or two or more types of solid electrolytes may be contained. Details of the solid electrolyte will be described later.

(Anode Active Material Layer)

The anode active material layer 22 contains, for example, an anode active material which can occlude and discharge a lithium ion. However, the anode active material layer 22 may include, for example, one, or two or more types of additives such as an anode binder, an anode conductive agent, a solid electrolyte, and the like, in addition to the anode active material described above.

The anode active material includes one, or two or more types of anode materials which can occlude and discharge a lithium ion. This is because a high energy density can be obtained by using a lithium ion as the electrode reactant ion as described above.

The anode material which can occlude and discharge a lithium ion is, for example, a carbon material, a metal-based material, a lithium-containing compound, a lithium metal, or the like.

Specific examples of the carbon material include graphite, easily graphitizable carbon, hardly graphitizable carbon, graphite, mesocarbon microbeads (MCMB), highly oriented graphite (HOPG), and the like.

The term "metal-based material" is a generic term for a material containing, as a constituent element, one, or two or more types of metal elements or semimetal elements, which can form an alloy with lithium. The metal-based material may be a single metal, an alloy, or a compound.

However, since a purity of the "single metal" described above is not limited to 100%, the single metal may contain a small amount of impurities. Such a definition of the single metal is applied to the following description in the same way.

Examples of the metal element and the semimetal element include silicon (Si), tin (Sn), aluminum (Al), indium (In), magnesium (Mg), boron (B), gallium (Ga), germanium (Ge), lead (Pb), bismuth (Bi), cadmium (Cd), silver (Ag), zinc (Zn), hafnium (Hf), zirconium (Zr), yttrium (Y), palladium (Pd), platinum (Pt), and the like.

Specific examples of the metal-based material include Si, Sn, $SiB_4$, $TiSi_2$, SiC, $Si_3N_4$, $SiO_v$ ($0<v\leq 2$), LiSiO, $SnO_w$ ($0<w\leq 2$), $SnSiO_3$, LiSnO, $Mg_2Sn$, and the like.

The term "lithium-containing compound" is a generic term for a compound containing lithium (Li) as a constituent element as described above. Examples of the lithium compound include a lithium transition metal composite oxide and the like, and the term "lithium transition metal composite oxide" is a generic term for an oxide containing lithium and one, or two or more types of transition metal elements as constituent elements as described above. Specific examples of the lithium transition metal composite oxide include $Li_4Ti_5O_{12}$ and the like.

The "lithium metal" denotes a so-called single substance of lithium. The lithium metal may contain a small amount of impurities as described above.

Details of the anode binder are the same as, for example, details of the cathode binder. However, the type of anode binder may be the same as or different from, for example, the type of cathode binder.

Details of the anode conductive agent are the same as, for example, details of the cathode conductive agent. However, the type of anode conductive agent may be the same as or different from, for example, the type of cathode conductive agent.

Note that the anode active material layer 22 may contain, for example, a solid electrolyte as described above. Only one type of solid electrolyte may be contained, or two or more types of solid electrolytes may be contained. Details of the solid electrolyte will be described later.

[Solid Electrolyte Layer]

The solid electrolyte layer 30 is a medium which moves a lithium ion between the cathode layer 10 and the anode layer 20, and is a so-called electrolyte in a solid state. Note that the solid electrolyte layer 30 may be, for example, a single layer or a multilayer.

The solid electrolyte layer 30 contains, for example, one, or two or more types of solid electrolytes. However, the solid electrolyte layer 30 may contain, for example, one, or two or more types of additives such as an electrolyte binder and the like, in addition to the solid electrolyte described above.

Examples of the solid electrolyte include a crystalline solid electrolyte and the like. The crystalline solid electrolyte is a crystalline electrolyte which can conduct a lithium ion.

The type of crystalline solid electrolyte is not particularly limited, and examples of the crystalline solid electrolyte include an inorganic material, a polymer material, and the like, and examples of the inorganic material include a sulfide, an oxide, and the like. Specific examples of the sulfide as the inorganic material include $Li_2S$—$P_2S_5$, $Li_2S$—$SiS_2$—$Li_3PO_4$, $Li_7P_3S_{11}$, $Li_{3.25}Ge_{0.25}P_{0.75}S$, $Li_{10}GeP_2S_{12}$, and the like. Specific examples of the oxide as the inorganic material include $Li_7La_3Zr_2O_{12}$, $Li_{6.75}La_3ZrT_{0.75}Nb_{0.25}O_{12}$, $Li_6BaLa_2Ta_2O_{12}$, $Li_{1+x}Al_xTi_{2-x}(PO_4)_3$, $La_{2/3-x}Li_{3x}TiO_3$, and the like. Specific examples of the polymer material include polyethylene oxide (PEO) and the like.

Details of the electrolyte binder are the same as, for example, details of the cathode binder. However, the type of electrolyte binder may be the same as or different from, for example, the type of cathode binder.

The solid electrolyte layers 30 include a solid electrolyte layer 30X, which is not disposed between the cathode 10 and the anode 20, and a solid electrolyte layer 30Y, which is disposed between the cathode 10 and the anode 20. Here, for example, as described above, the lowermost layer and the uppermost layer in the laminate 1 are the solid electrolyte layers 30, not the cathode layer 10 or the anode layer 20, and thus the solid electrolyte layers 30 include two solid electrolyte layers 30X and two solid electrolyte layers 30Y.

In the solid electrolyte layers 30Y, a property (ion conductivity) varies in the width direction. A property and a detailed configuration of the solid electrolyte layers 30Y will be described later. Note that in the solid electrolyte layers 30X, a property (ion conductivity) may vary in the width direction similarly to in the solid electrolyte layers 30Y described above or may not vary in the width direction. FIG. 1 illustrates, for example, a case where a property varies in the width direction also in the solid electrolyte layers 30X due to a process of manufacturing a solid-state battery to be described layer.

[Insulating Layer]

The insulating layer 40 electrically separates the cathode layer 10 and the anode layer 20 from the vicinity of the cathode layer 10 and the anode layer 20. Since the insulating layer 40 is, for example, interposed between the cathode layer 10 and the anode terminal 60, the insulating layer 40 electrically separates the cathode layer 10 from the anode terminal 60. Since the insulating layer 40 is, for example, interposed between the anode layer 20 and the cathode terminal 50, the insulating layer 40 electrically separates the anode layer 20 from the cathode terminal 50.

The insulating layer 40 contains, for example, one, or two or more types of insulating materials. However, the insulating layer 40 may contain, for example, one, or two or more types of additives such as an insulating binder, a solid electrolyte, and the like, in addition to the insulating materials described above. Examples of the insulating material include aluminum oxide (alumina) and the like. Ion conductivity of the insulating layer 40 is not particularly limited. That is, the insulating layer 40 may or may not have, for example, lithium ion conductivity as long as the insulating layer 40 has an insulating property.

Details of the insulating binder are the same as, for example, details of the cathode binder. However, the type of insulating binder may be the same as or different from, for example, the type of cathode binder.

Note that the insulating layer 40 may contain, for example, a solid electrolyte as described above. Only one type of solid electrolyte may be contained, or two or more types of solid electrolytes may be contained. Details of the solid electrolyte will be described later.

[Cathode Terminal]

The cathode terminal 50 is attached to one side surface (left side surface) of the laminate 1 in the width direction. As a result, the cathode terminal 50 is in contact with the cathode layer 10 and is thus electrically connected to the cathode layer 10. Note that the cathode terminal 50 may extend, for example, from the left side surface of the laminate 1 to a portion of an upper surface of the laminate 1 and from the left side surface of the laminate 1 to a portion of a lower surface of the laminate 1.

The cathode terminal 50 contains, for example, one, or two or more types of conductive materials. However, the cathode terminal 50 may contain, for example, one, or two or more types of additives such as a cathode terminal binder, a solid electrolyte, and the like, in addition to the conductive materials described above.

Examples of the conductive material include a metal material and the like. Specific examples of the metal material include silver (Ag), gold (Au), platinum (Pt), aluminum (Al), copper (Cu), tin (Sn), nickel (Ni), and the like. However, the metal material may also be an alloy of two or more of the specific examples of the metal material described above.

Details of the cathode terminal binder are the same as, for example, details of the cathode binder. However, the type of cathode terminal binder may be the same as or different from, for example, the type of cathode binder.

Note that the cathode terminal 50 may contain, for example, a solid electrolyte as described above. Only one type of solid electrolyte may be contained, or two or more types of solid electrolytes may be contained. Details of the solid electrolyte will be described later.

[Anode Terminal]

The anode terminal 60 is spaced apart from the cathode terminal 50 and is attached to the other side surface (right side surface) of the laminate 1 in the width direction. As a result, the anode terminal 60 is in contact with the anode layer 20 and is thus electrically connected to the anode layer 20. Note that the anode terminal 60 may extend, for example, from the right side surface of the laminate 1 to a portion of the upper surface of the laminate 1 and from the right side surface of the laminate 1 to a portion of the lower surface of the laminate 1.

A configuration of the anode terminal 60 is, for example, the same as that of the cathode terminal 50. That is, the anode terminal 60 contains one, or two or more types of conductive materials and may contain one, or two or more types of additives such as an anode terminal binder, a solid electrolyte, and the like. However, a material for forming the anode terminal 60 may be the same as or different from, for example, that of the cathode terminal 50.

Details of the anode terminal binder are the same as, for example, details of the cathode binder. However, the type of anode terminal binder may be the same as or different from, for example, the type of cathode binder.

Note that the anode terminal 60 may contain, for example, a solid electrolyte as described above. Only one type of solid electrolyte may be contained, or two or more types of solid electrolytes may be contained. Details of the solid electrolyte will be described later.

1-2. Property and Detailed Configuration of Solid Electrolyte Layer

Next, a property of the solid electrolyte layer 30Y and a detailed configuration of the solid electrolyte layer 30Y for obtaining the property will be described with reference to FIG. 1.

The cathode layer 10 extending in the width direction is in contact with the cathode terminal 50 and is spaced apart from the anode terminal 60 while having the insulating layer 40 interposed therebetween as described above. Meanwhile, the anode layer 20 extending in the width direction is spaced apart from the cathode terminal 50 while having the insulating layer 40 interposed therebetween and is in contact with the anode terminal 60 as described above. In this configuration, the anode layer 20 partially faces the cathode layer 10, and a lithium ion moves mainly in a region in which the cathode layer 10 and the anode layer 20 face each other.

In this case, a first region (facing region R1) in which the cathode layer 10 and the anode layer 20 face each other and a second region (non-facing region R2) in which the cathode layer 10 and the anode layer 20 do not face each other are present based on the positional relation between the cathode layer 10 and the anode layer 20.

As for a relation between the facing region R1 and the non-facing region R2, and the property (ion conductivity) of the solid electrolyte layer 30Y, in the solid electrolyte layer 30Y, the property (ion conductivity) varies in the width direction as described above.

The solid electrolyte layer 30Y includes a high ion conductivity portion 31 positioned adjacent to the anode terminal 60 in the width direction and having a relatively high ion conductivity C1, and a low ion conductivity portion 32 positioned adjacent to the cathode terminal 50 in the width direction and having a relatively low ion conductivity C2. That is, the ion conductivity C2 of the low ion conductivity portion 32 is lower than the ion conductivity C1 of the high ion conductivity portion 31. In FIG. 1, shading is applied to the low ion conductivity portion 32 in order to facilitate distinguishing between the high ion conductivity portion 31 and the low ion conductivity portion 32.

Here, for example, a position of a boundary between the high ion conductivity portion 31 and the low ion conductivity portion 32 coincides with a position of a boundary between the facing region R1 and the non-facing region R2. For this reason, the low ion conductivity portion 32 is positioned, for example, to face the cathode layer 10 in the non-facing region R2, and the high ion conductivity portion 31 is positioned at, for example, the facing portion R1.

The ion conductivity C2 of the low ion conductivity portion 32 is lower than the ion conductivity C1 of the high ion conductivity portion 31 to suppress occurrence of a short circuit caused by movement of a large amount of lithium ions from the cathode layer 10 to the anode layer 20 at the time of operation (charging and discharging) of the solid-state battery. The reason why the occurrence of the short circuit is suppressed by a difference between the ion conductivities C1 and C2 will be described in detail later.

A configuration of the high ion conductivity portion 31 and a configuration of the low ion conductivity portion 32 differ from each other to ensure a difference between the ion conductivities C1 and C2.

The low ion conductivity portion 32 contains, for example, one, or two or more types of specific alkali metal elements in addition to the solid electrolyte described above. The specific alkali metal element is, for example, a different type of alkali metal element from the electrode reactant ion (the ion of the alkali metal element). Examples of the specific alkali metal element include sodium (Na), potassium (K), rubidium (Rb), cesium (Cs), francium (Fr), and the like. The low ion conductivity portion 32 contains the specific alkali metal element so that the ion conductivity C2 becomes sufficiently lower, due to a mixed alkali effect, than in a case where the low ion conductivity portion 32 would not contain the specific alkali metal element.

As apparent from the type of solid electrolyte contained in the solid electrolyte layer 30Y described above, the specific alkali metal element described herein is an element which originally is not supposed to be contained in the solid electrolyte layer 30Y.

In contrast, the high ion conductivity portion 31 does not contain the specific alkali metal element described above. The high ion conductivity portion 31 does not contain the specific alkali metal element so that the ion conductivity C1 becomes sufficiently higher than in a case where the high ion conductivity portion 31 would contain the specific alkali metal element.

In a case of using the specific alkali metal element, the ion conductivity C2 of the low ion conductivity portion 32 becomes lower than the ion conductivity C1 of the high ion conductivity portion 31 due to the presence of the specific alkali metal element.

Note that the cathode active material (cathode material) contained in the cathode layer 10 does not contain the specific alkali metal element as a constituent element. In this case, the specific alkali metal element contained in the low ion conductivity portion 32 is an element which is not supposed to be originally contained in the cathode layer 10.

Note that as apparent from FIG. 1, the solid electrolyte layer 30 includes, for example, a portion (another ion conductivity portion 33) disposed to face the anode layer 20 in another region, in addition to the high ion conductivity portion 31 disposed in the facing region R1 and the low ion conductivity portion 32 disposed to face the cathode layer 10 in the non-facing region R2. An ion conductivity C3 of the another ion conductivity portion 33 is not particularly limited, and is, for example, the same as the ion conductivity C1. That is, for example, the another ion conductivity portion 33 does not include the specific alkali metal element, similarly to the high ion conductivity portion 31.

Here, as long as the ion conductivity C2 is lower than the ion conductivity C1, a value of each of the ion conductivities C1 and C2 is not particularly limited. In particular, the ion conductivity C1 is preferably $10^{-4}$ S/cm to $10^{-6}$ S/cm, and the ion conductivity C2 is preferably $10^{-7}$ S/cm or less in order to suppress the occurrence of the short circuit described above while carrying out a smooth and sufficient electrode reaction (charge and discharge reaction) by ensuring the lithium ion moving speed.

1-3. Operation

Next, operation of the solid-state battery will be described in detail with reference to FIG. 1.

At the time of charging, a lithium ion is discharged from the cathode layer 10 and the lithium ion is occluded into the anode layer 20 through the solid electrolyte layer 30. Meanwhile, at the time of discharging, a lithium ion is discharged from the anode layer 20 and the lithium ion is occluded into the cathode layer 10 through the solid electrolyte layer 30.

1-4. Manufacturing Method

Next, a manufacturing method of the solid-state battery will be described.

The solid-state battery is manufactured by sequentially performing, in the following order, for example, a process of forming a cathode green sheet 100, a process of forming an anode green sheet 200, a process of forming a laminate precursor 1Z, a process of forming the cathode terminal 50, and a process of forming the anode terminal 60, as will be described later. Note that the laminate precursor 1Z is a precursor for forming the laminate 1.

Figure 2:
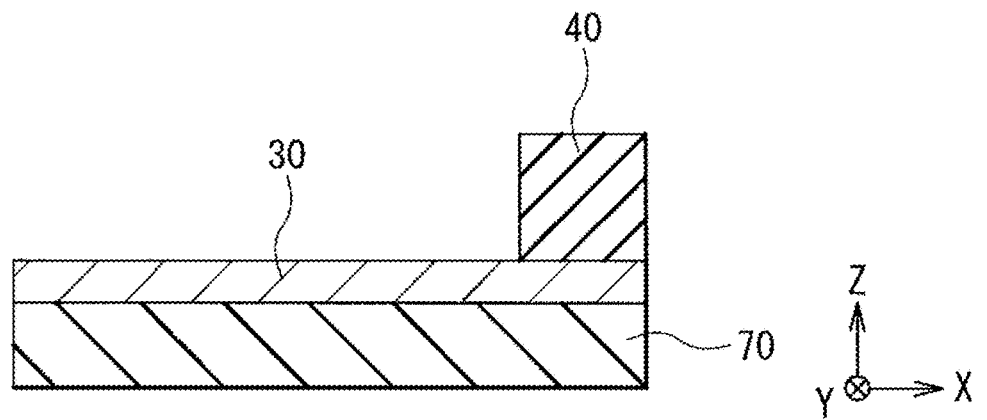
FIG. 2 is a sectional view for describing a process of preparing a cathode green sheet.
Figure 3:
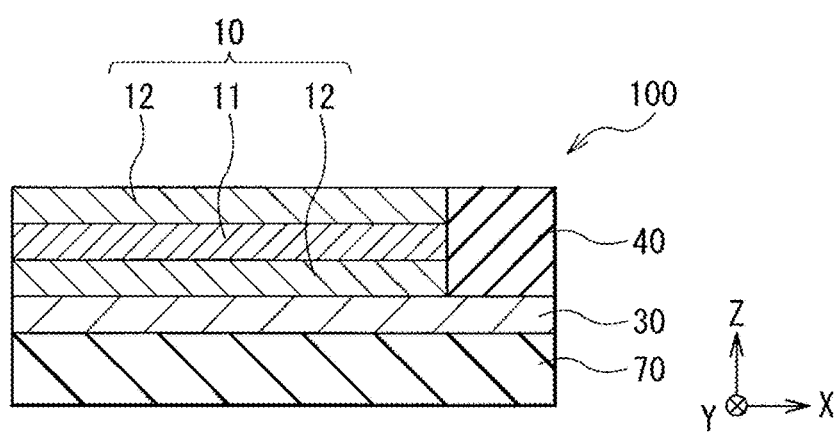
FIG. 3 is a sectional view for describing the process of preparing a cathode green sheet, subsequent to FIG. 2.
Figure 4:
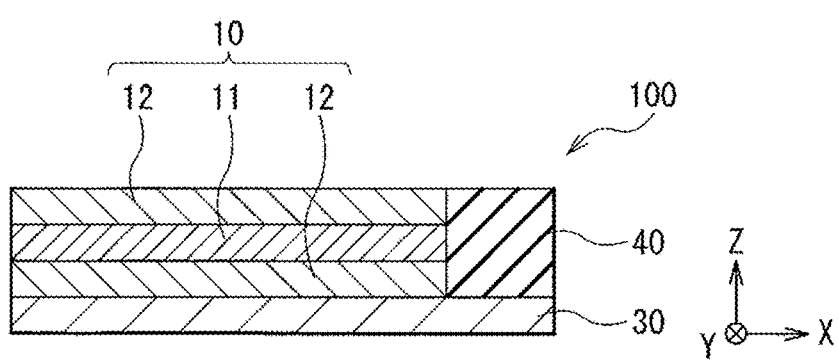
FIG. 4 is a sectional view for describing the process of preparing a cathode green sheet, subsequent to FIG. 3.
Figure 5:
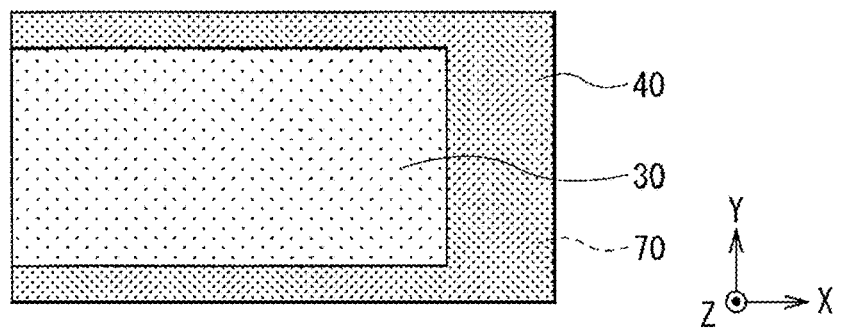
FIG. 5 is a plan view for describing the process of preparing a cathode green sheet.
Figure 6:
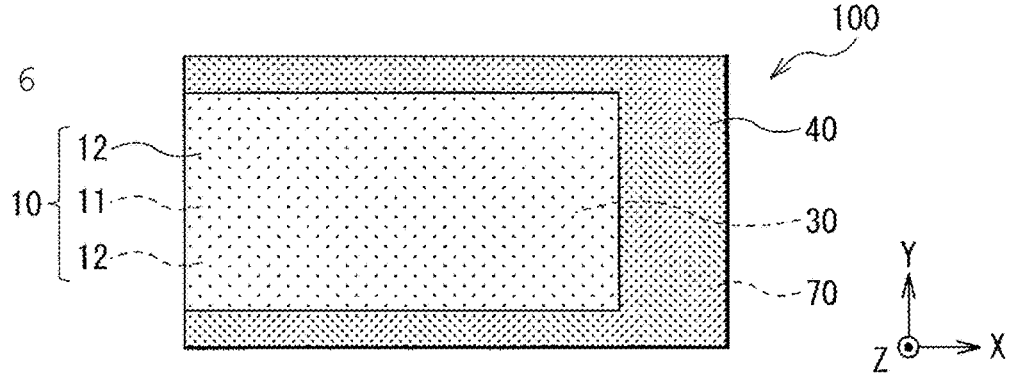
FIG. 6 is a plan view for describing the process of preparing a cathode green sheet, subsequent to FIG. 5.
Figure 7:
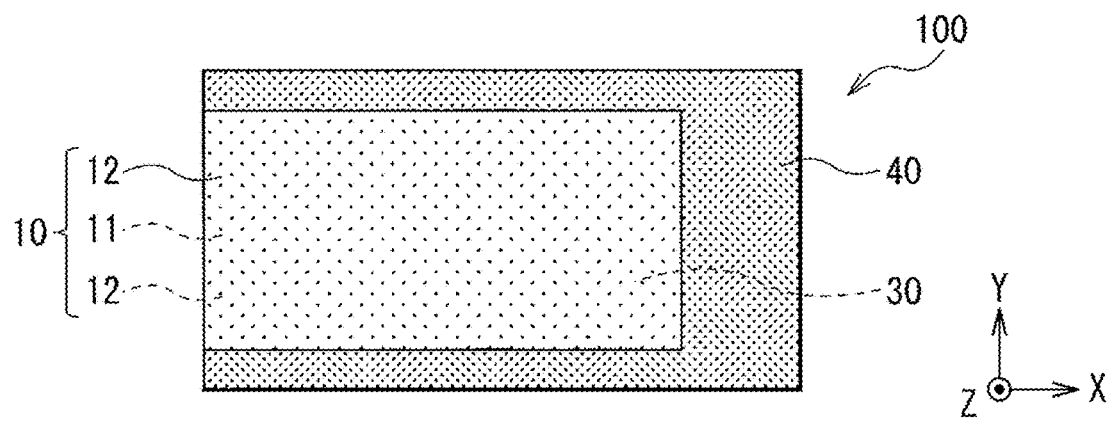
FIG. 7 is a plan view for describing the process of preparing a cathode green sheet, subsequent to FIG. 6.

FIGS. 2 to 4 each illustrate a sectional configuration corresponding to FIG. 1, respectively, for describing the process of forming the cathode green sheet 100. FIGS. 5 to 7 each illustrate a plane configuration corresponding to FIGS. 2 to 4, respectively.

Figure 8:
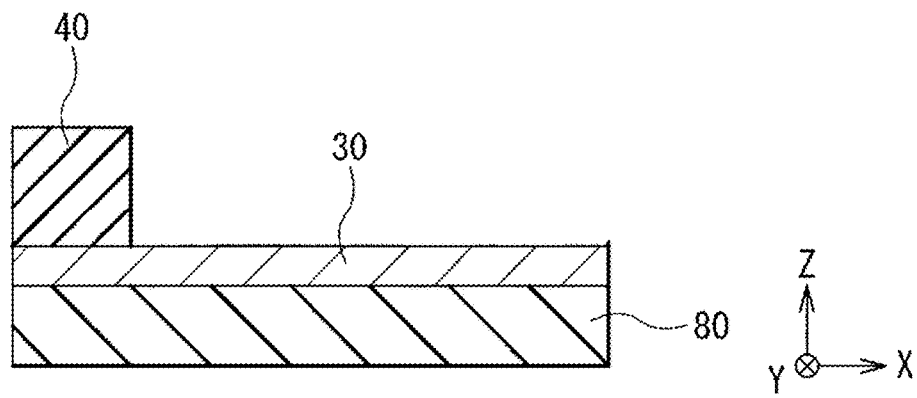
FIG. 8 is a sectional view for describing a process of preparing an anode green sheet.
Figure 9:
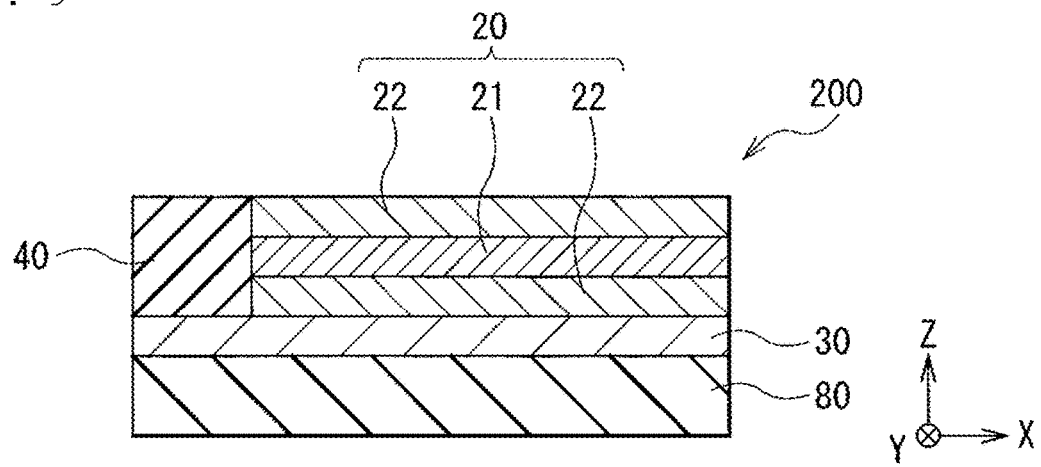
FIG. 9 is a sectional view for describing the process of preparing an anode green sheet, subsequent to FIG. 8.
Figure 10:
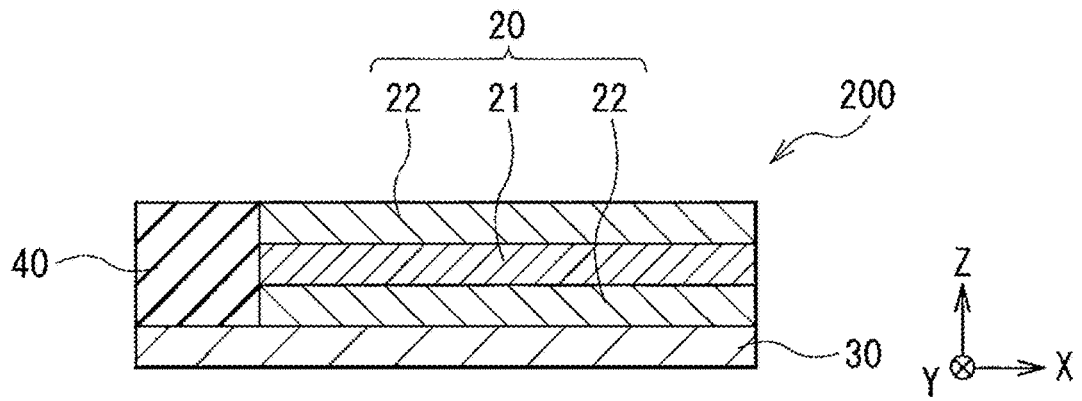
FIG. 10 is a sectional view for describing the process of preparing an anode green sheet, subsequent to FIG. 9.
Figure 11:
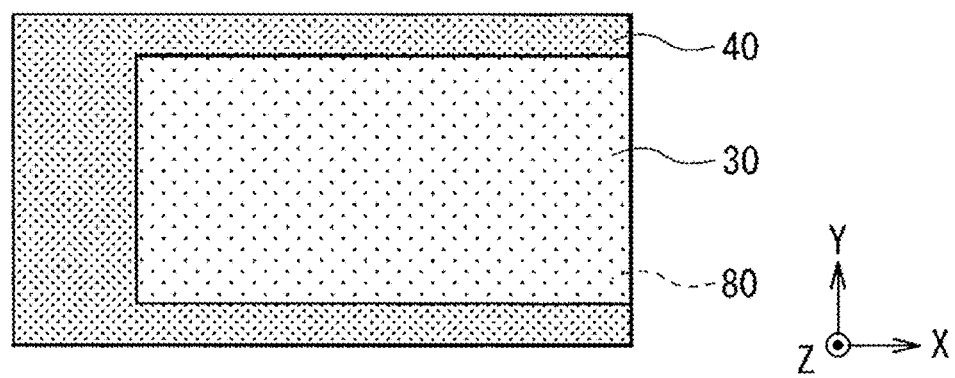
FIG. 11 is a plan view for describing a process of preparing an anode green sheet.
Figure 12:
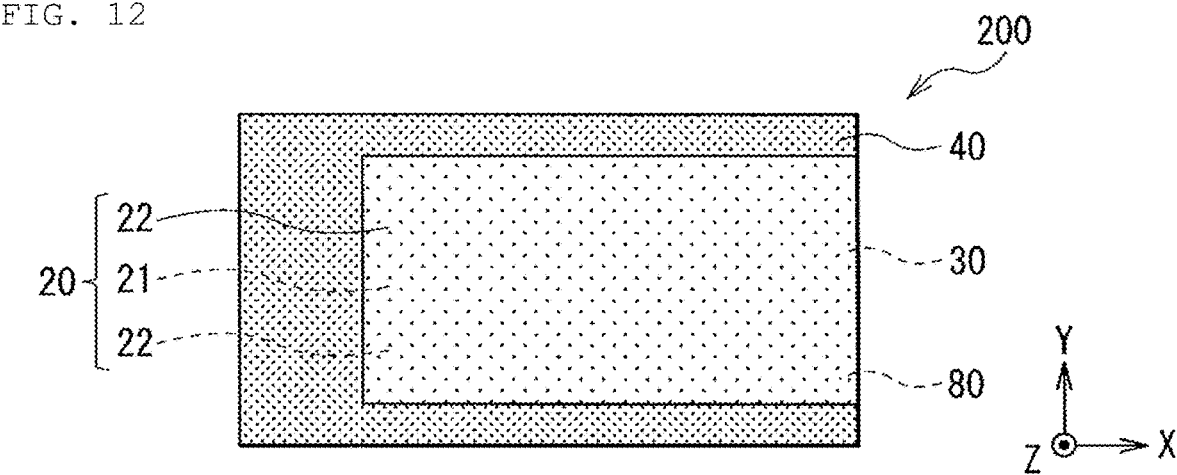
FIG. 12 is a plan view for describing the process of preparing an anode green sheet, subsequent to FIG. 11.
Figure 13:
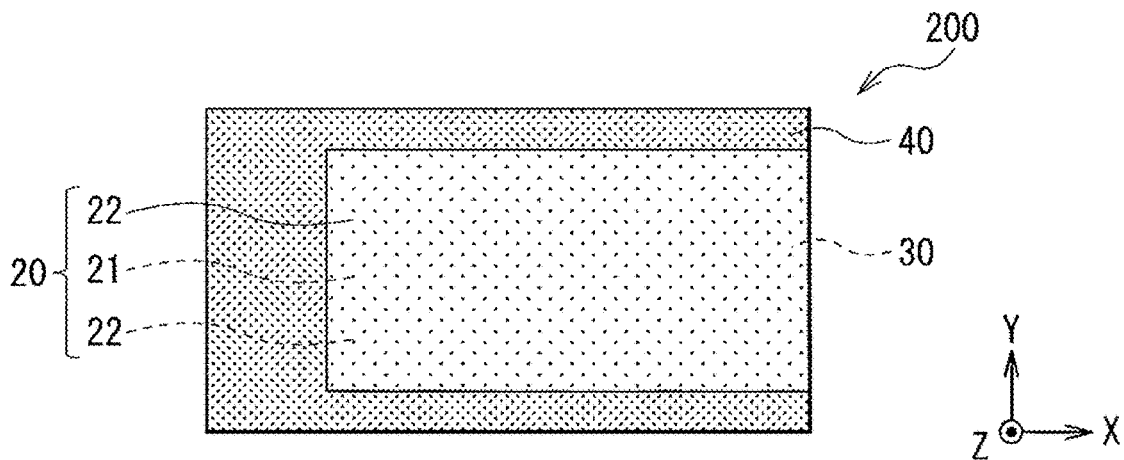
FIG. 13 is a plan view for describing the process of preparing an anode green sheet, subsequent to FIG. 12.

FIGS. 8 to 10 each illustrate a sectional configuration corresponding to FIG. 1, respectively, for describing the process of forming the anode green sheet 200. FIGS. 11 to 13 each illustrate a plane configuration corresponding to FIGS. 8 to 10, respectively.

Figure 14:
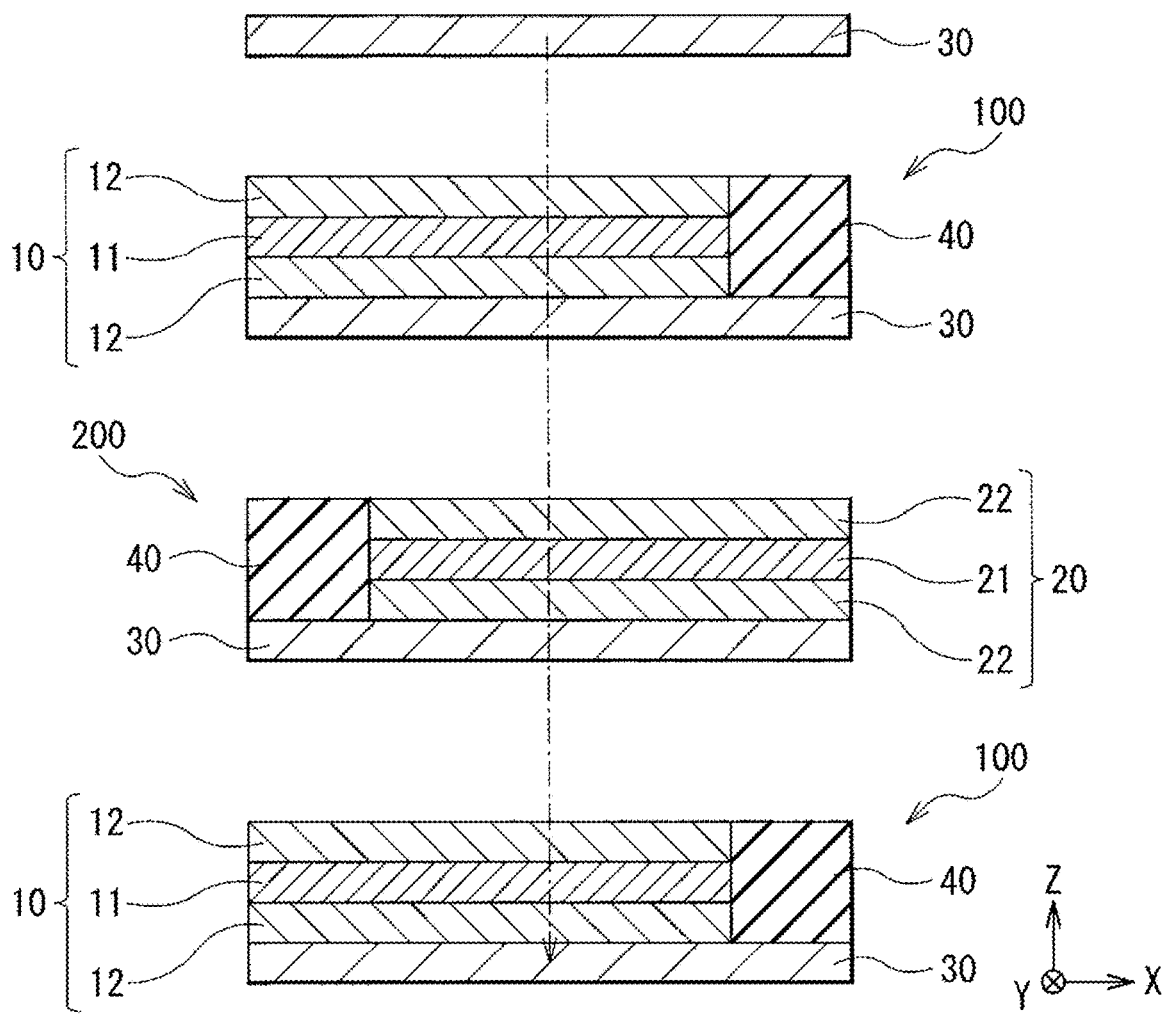
FIG. 14 is a sectional view for describing a process of preparing a laminate precursor.
Figure 15:
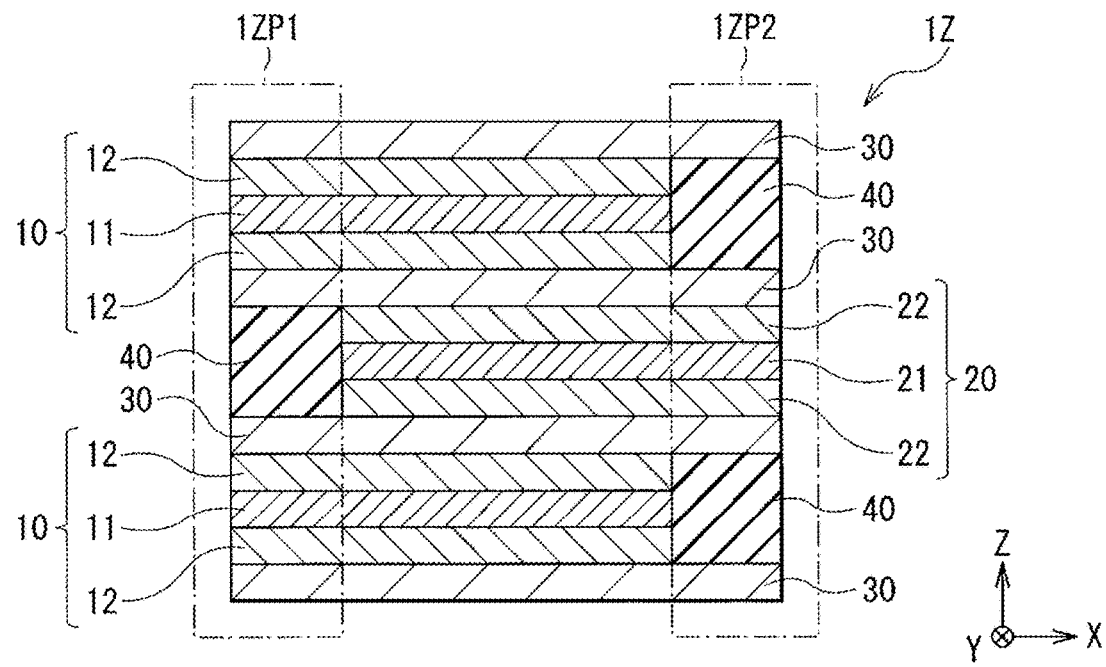
FIG. 15 is a sectional view for describing a process of manufacturing a cathode terminal and a process of manufacturing an anode terminal.

FIG. 14 illustrates a sectional configuration corresponding to FIG. 1 for describing the process of forming the laminate precursor 1Z. FIG. 15 illustrates a sectional configuration corresponding to FIG. 1 for describing the process of forming the cathode terminal 50 and the process of forming the anode terminal 60.

[Process of Forming Cathode Green Sheet]

In a case of forming the cathode green sheet 100, first, a solid electrolyte, a solvent, and as necessary the electrolyte binder or the like are mixed with each other, and the mixture is then stirred, thereby enabling an electrolyte slurry to be prepared. The type of solvent is not particularly limited, and is, for example, one, or two or more types of organic solvents and the like. Specific examples of the organic solvent include butyl acetate, N-methyl-pyrrolidone, toluene, and the like.

Then, as illustrated in FIGS. 2 and 5, the solid electrolyte layer 30 is formed on a substrate 70. In this case, the electrolyte slurry is applied to one surface of the substrate 70 and then dried. The type of substrate 70 is not particularly limited, and is, for example, a release film of which one surface to which the electrolyte slurry is applied is subjected to release processing, or the like.

Next, an insulating material, a solvent, and as necessary an insulating binder, a solid electrolyte, and the like are mixed with each other, and the mixture is then stirred, thereby enabling an insulating slurry to be prepared. The type of solvent relating to the insulating slurry is the same as, for example, the type of solvent relating to the electrolyte slurry.

Then, the insulating layer 40 is selectively formed on the solid electrolyte layer 30 by using a pattern forming method. The pattern forming method is one, or two or more of methods in which a layer can be formed so as to have a desired pattern shape (planar shape). The pattern forming method is not particularly limited, and examples of the pattern forming method include a screen printing method, a gravure printing method, and the like. The details of the pattern forming method described herein are applied to the following description in the same way. In a case of forming the insulating layer 40 by using the pattern forming method, the insulating slurry is applied to a partial region of a surface of the solid electrolyte layer 30 and then dried.

A pattern shape of the insulating layer 40 is not particularly limited, and is, for example, a shape which can expose the solid electrolyte layer 30 at a central region and a partial region at the left side (the side at which the cathode terminal 50 is formed in the subsequent process) in the width direction as illustrated in FIG. 5.

Next, a cathode active material, a solvent, and as necessary a cathode binder, a cathode conductive agent, a solid electrolyte, and the like are mixed with each other, and the mixture is then stirred, thereby enabling a cathode active material slurry to be prepared. The type of solvent is not particularly limited, and is, for example, one, or two or more types of organic solvents and the like. Specific examples of the organic solvent include terpineol, N-methyl-pyrrolidone, and the like. Examples of the terpineol include α-terpineol, β-terpineol, γ-terpineol, δ-terpineol and the like.

Then, as illustrated in FIGS. 3 and 6, the cathode active material layer 12 is formed on the solid electrolyte layer 30 by using the pattern forming method. In this case, the cathode active material slurry is applied to a surface (exposed surface) of the solid electrolyte layer 30 and then dried.

Next, a conductive material, a solvent, and as necessary a cathode current collector binder, a solid electrolyte, and the like are mixed with each other, and the mixture is then stirred, thereby enabling a cathode current collector slurry to be prepared. The type of solvent relating to the cathode current collector slurry is the same as, for example, the type of solvent relating to the cathode active material slurry.

Then, the cathode current collector layer 11 is formed on the cathode active material layer 12 by using the pattern forming method. In this case, the cathode current collector slurry is applied to a surface of the cathode active material layer 12 and then dried.

Finally, the cathode active material layer 12 is formed on the cathode current collector layer 11 by using the pattern forming method. In this case, the cathode active material slurry is applied to a surface of the cathode current collector layer 11 and then dried. By doing so, the cathode active material layers 12 are disposed on both surfaces of the cathode current collector layer 11, thereby forming the cathode layer 10. As a result, the cathode green sheet 100 including the solid electrolyte layer 30, the insulating layer 40, and the cathode layer 10 is obtained.

Note that the cathode green sheet 100, for example, may be used in a state of including the substrate 70 as illustrated in FIGS. 3 and 6. Alternatively, for example, the cathode green sheet 100 may be used in a state of not including the substrate 70 by separating the solid electrolyte layer 30 from the substrate 70 as illustrated in FIGS. 4 and 7.

[Process of Forming Anode Green Sheet]

In a case of forming the anode green sheet 200, first, an electrolyte slurry is prepared according to the procedure described above. Then, as illustrated in FIGS. 8 and 11, the solid electrolyte layer 30 is formed on a substrate 80. In this case, the electrolyte slurry is applied to one surface of the substrate 80 and then dried. Details of the substrate 80 are the same as, for example, details of the substrate 70.

Next, an insulating slurry is prepared according to the procedure described above. Then, the insulating layer 40 is selectively formed on the solid electrolyte layer 30 by using a pattern forming method. In this case, the insulating slurry is applied to a partial region of a surface of the solid electrolyte layer 30 and then dried. A pattern shape of the insulating layer 40C is not particularly limited, and is, for example, a shape which can partially expose the solid electrolyte layer 30 at a central region and a partial region at the right side (the side on which the anode terminal 60 is formed in the subsequent process) in the width direction as illustrated in FIG. 11.

Next, an anode active material, a solvent, and as necessary an anode binder, an anode conductive agent, a solid electrolyte, and the like are mixed with each other, and the mixture is then stirred, thereby enabling an anode active material slurry to be prepared. The type of solvent relating to the anode active material slurry is the same as, for example, the type of solvent relating to the cathode active material slurry. Then, as illustrated in FIGS. 9 and 12, the anode active material layer 22 is formed on the solid electrolyte layer 30 by using the pattern forming method. In this case, the anode active material slurry is applied to a surface (exposed surface) of the solid electrolyte layer 30 and then dried.

Next, a conductive material, a solvent, and as necessary a cathode current collector binder, a solid electrolyte, and the like are mixed with each other, and the mixture is then stirred, thereby enabling an anode current collector slurry to be prepared. The type of solvent relating to the anode current collector slurry is the same as, for example, the type of solvent relating to the anode active material slurry. Then, the anode current collector layer 21 is formed on the anode active material layer 22 by using the pattern forming method. In this case, the anode current collector slurry is applied to a surface of the anode active material layer 22 and then dried.

Finally, the anode active material layer 22 is formed on the anode current collector layer 21 by using the pattern forming method. In this case, the cathode active material slurry is applied to a surface of the anode current collector layer 21 and then dried. As a result, the anode active material layers 22 are disposed on both surfaces of the anode current collector layer 21, thereby forming the anode layer 20. As a result, the anode green sheet 200 including the solid electrolyte layer 30, the insulating layer 40, and the anode layer 20 is obtained.

Note that the anode green sheet 200, for example, may be used in a state of including the substrate 80 as illustrated in FIGS. 9 and 12. Alternatively, for example, the anode green sheet 200 may be used in a state of not including the substrate 80 by separating the solid electrolyte layer 30 from the substrate 80 as illustrated in FIGS. 10 and 13.

[Process of Forming Laminate Precursor]

In a case of forming the laminate precursor 1Z, as illustrated in FIG. 14, the cathode green sheet 100 from which the substrate 70 is removed, and the anode green sheet 20 from which the substrate 80 is removed are laminated. Here, for example, two cathode green sheets 100 are laminated with one anode green sheet 200 interposed therebetween in order to manufacture the solid-state battery illustrated in FIG. 1.

Thereafter, the solid electrolyte layer 30 is formed on the cathode green sheet 100 which is the uppermost layer. In this case, an electrolyte slurry is applied to a surface of the cathode greet sheet 100 and then dried.

By doing so, the laminate precursor 1Z is obtained as illustrated in FIG. 15. Note that after the laminate precursor 1Z is formed, the laminate precursor 1Z may be heated. Conditions such as heating temperature, heating time, and the like can be arbitrarily set. Consecutive layers constituting the laminate precursor 1Z are thermally compressed with each other by the heating processing.

[Process of Forming Cathode Terminal]

In a case of forming the cathode terminal 50, first, a conductive material, a solvent, an ion conductivity adjusting material, and as necessary a cathode terminal binder, a solid electrolyte, or the like are mixed with each other, and the mixture is then stirred, thereby enabling a cathode terminal slurry to be prepared. The type of solvent relating to the cathode terminal slurry is the same as, for example, the type of solvent relating to the cathode active material slurry.

The ion conductivity adjusting material is a material which can adjust the ion conductivity of the solid electrolyte layer 30, and more specifically a material which can lower the ion conductivity.

The type of ion conductivity material is not particularly limited as long as the ion conductivity material can lower the ion conductivity of the solid-state electrolyte layer 30, and is, for example, an aqueous solvent, a specific alkali metal compound, or the like.

Examples of the aqueous solvent include pure water and the like. It is considered that the aqueous solvent functions as the ion conductivity adjusting material because the ion conductivity of the solid electrolyte layer 30 is lowered due to a reaction between the solid electrolyte contained in the solid electrolyte layer 30 and the aqueous solvent.

The specific alkali metal compound is a compound containing the specific alkali metal element, for example, a carbon compound or the like as a constituent element. Specific examples of the carbon compound include sodium carbonate, potassium carbonate, rubidium carbonate, cesium carbonate, francium carbonate, and the like. It is considered that the specific alkali metal compound functions as the ion conductivity adjusting material because the ion conductivity of the solid electrolyte layer 30 is lowered due to the so-called mixed alkali effect.

The content of ion conductivity adjusting material in the cathode terminal slurry is not particularly limited. The content of ion conductivity adjusting material can be arbitrarily set according to, for example, the amount by which the ion conductivity of the solid electrolyte layer 30 is lowered, or the like.

Next, as illustrated in FIG. 15, a portion (portion 1ZP1) of the laminate precursor 1Z is immersed in the cathode terminal slurry. The portion 1ZP1 is, for example, a portion corresponding to the non-facing region R2 illustrated in FIG. 1, that is, a portion corresponding to the low ion conductivity portion 32. Note that conditions such as immersing time and the like can be arbitrarily set.

Finally, the laminate precursor 1Z is taken out from the cathode terminal slurry, and the cathode terminal slurry attached to the laminate precursor 1Z is then dried. Thereafter, the cathode terminal slurry may be heated as necessary. By doing so, the cathode terminal 50 is formed as illustrated in FIG. 1.

In the case of forming the cathode terminal 50, in a process in which the laminate precursor 1 (portion 1ZP1) is immersed in the cathode terminal slurry, the ion conductivity adjusting material contained in the cathode terminal slurry permeates (is diffused into) the portion 1ZP1. By doing so, the ion conductivity of the portion 1ZP1 after forming the cathode terminal 50 becomes lower than the ion conductivity of the portion 1ZP1 before forming the cathode terminal 50, and as a result, the low ion conductivity portion 32 having the ion conductivity C2 is formed.

In particular, in a case of using the specific alkali metal compound as the ion conductivity adjusting material, the specific alkali metal element contained in the specific alkali metal compound permeates the portion 1ZP1. For this reason, after forming the cathode terminal 50, the low ion conductivity portion 32 contains the specific alkali metal element.

[Process of Forming Anode Terminal]

In a case of forming the anode terminal 60, first, a conductive material, a solvent, and as necessary an anode terminal binder, a solid electrolyte, or the like are mixed with each other, and the mixture is then stirred, thereby enabling an anode terminal slurry to be prepared. The type of solvent relating to the anode terminal slurry is the same as, for example, the type of solvent relating to the cathode active material slurry. The anode terminal slurry is different from the cathode terminal slurry and does not contain the ion conductivity adjusting material.

Next, as illustrated in FIG. 15, a portion (portion 1ZP2) of the laminate precursor 1Z is immersed in the anode terminal slurry. The portion 1ZP2 is, for example, a portion corresponding to the another ion conductivity portion 33 illustrated in FIG. 1. Note that conditions such as immersing time and the like can be arbitrarily set.

Finally, the laminate precursor 1Z is taken out from the anode terminal slurry and the anode terminal slurry attached to the laminate precursor 1Z is then dried. Thereafter, the anode terminal slurry may be heated as necessary. By doing so, the anode terminal 60 is formed as illustrated in FIG. 1.

In the case of forming the anode terminal 60, since the ion conductivity adjusting material is not contained in the anode terminal slurry, the ion conductivity of the portion 1ZP2 before and after the process of forming the anode terminal 60 does not change. Accordingly, the lower ion conductivity portion 32 having the ion conductivity C2 is formed in the process of forming the cathode terminal 50 described above, meanwhile, the high ion conductivity portion 31 having the ion conductivity C1 and the another ion conductivity portion 33 having the ion conductivity C3 are formed in the process of forming the anode terminal 50. As a result, the solid electrolyte layer 30 including the high ion conductivity portion 31, the low ion conductivity portion 32, and the another ion conductivity portion 33 is formed, thereby forming the laminate 1.

The ion conductivity C1 of the high ion conductivity portion 31 and the ion conductivity C3 of the another ion conductivity portion 33 are, for example, the same as each other. Further, the ion conductivity C2 of the low ion conductivity portion 32 is lower than each of the ion conductivity C1 of the high ion conductivity portion 31 and the ion conductivity C3 of the another ion conductivity portion 33.

1-5. Action and Effect

According to the solid-state battery of the present technology, an action and an effect to be described below can be achieved.

[Main Action and Effect]

In the solid-state battery of the present technology, the solid electrolyte layer 30 includes the solid electrolyte layer 30Y disposed between the cathode layer 10 and the anode layer 20. The solid electrolyte layer 30Y includes the high ion conductivity portion 31 positioned adjacent to the anode terminal 60 and the low ion conductivity portion 32 positioned adjacent to the cathode terminal 50. The ion conductivity C2 of the low ion conductivity portion 32 is lower than the ion conductivity C1 of the high ion conductivity portion 31. Therefore, it is possible to improve safety of the solid-state battery for the reason to be described later.

Figure 16:
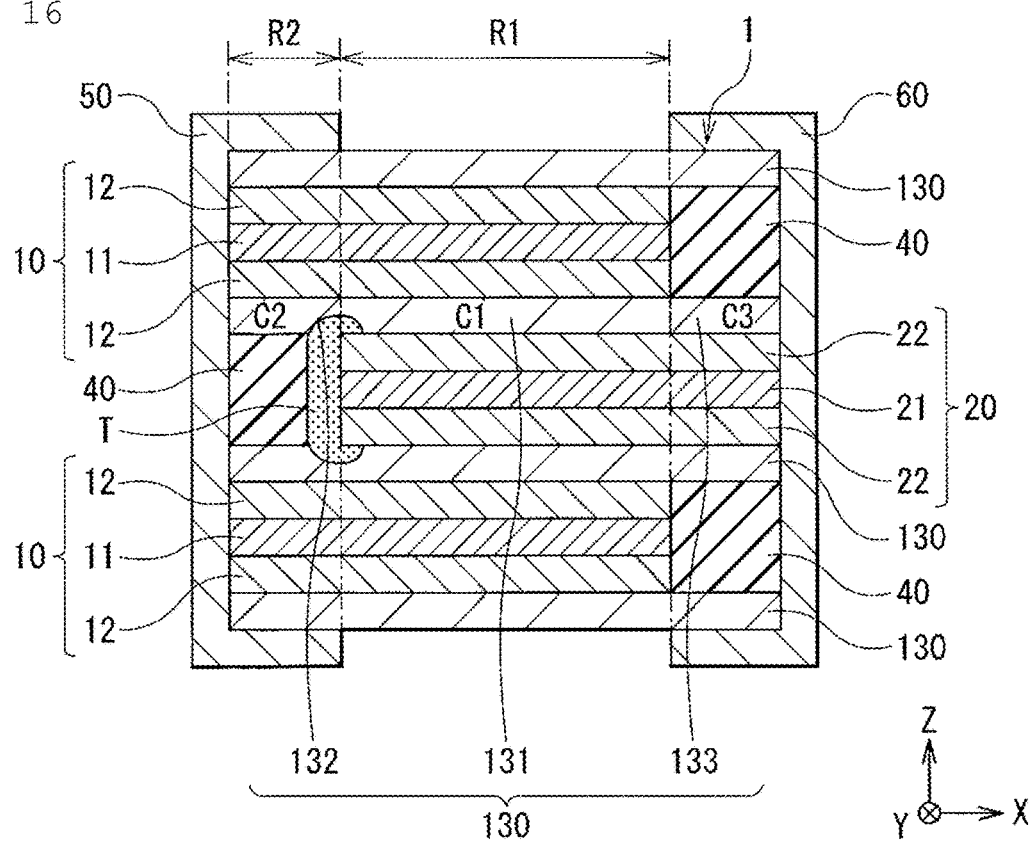
FIG. 16 is a sectional view illustrating a configuration of a solid-state battery of Comparative Example.

FIG. 16 illustrates a sectional configuration of a solid-state battery of Comparative Example, which corresponds to FIG. 1. The solid-state battery of Comparative Example has, for example, the same configuration as that of the solid-state battery of the present technology except for including a solid electrolyte layer 130 (ion conductivity portions 131 to 133) instead of the solid electrolyte layer 30 (the high ion conductivity portion 31, the low ion conductivity portion 32, and the another ion conductivity portion 33).

In the solid-state battery of Comparative Example, a cathode terminal 50 is formed by using a cathode terminal slurry which does not contain the ion conductivity adjusting material. Therefore, the ion conductivity C1 of the ion conductivity portion 131, the ion conductivity C2 of the ion conductivity portion 132, and the ion conductivity C3 of the ion conductivity portion 133 are the same as one another.

In the solid-state battery of Comparative Example, as illustrated in FIG. 16, the ion conductivity C2 of the ion conductivity portion 132 is not lower than the ion conductivity C1 of the ion conductivity portion 131, and thus a lithium ion can be conducted in the ion conductivity portion 132 as easily as in the ion conductivity portion 131.

In this case, when excess lithium ions are discharged from a cathode layer 10 in a non-facing region R2, the excess lithium ions easily reach a portion of an anode layer 20 in the vicinity of the non-facing region R2, such that a large amount of lithium ions including the excess lithium ions are easily supplied to the anode layer 20. However, since the anode layer 20 cannot completely occlude the large amount of lithium ions, a phenomenon in which a lithium ion which is not occluded into the anode layer 20 is unintentionally precipitated easily occurs.

As a result, since a precipitate T is easily generated in a portion of the anode layer 20 in the vicinity of the non-facing region R2, a possibility that the cathode layer 10 and the anode layer 20 are short-circuited due to the presence of the precipitate T increases. The precipitate T is a so-called lithium dendrite (lithium metal).

Therefore, in the solid-state battery of Comparative Example, a possibility that a short circuit occurs is high, and thus it is difficult to improve safety. Naturally, it is difficult to continuously perform normal charging and discharging operation of the solid-state battery of Comparative Example when a short circuit occurs.

Whereas, in the solid-state battery of the present technology, as illustrated in FIG. 1, the ion conductivity C2 of the low ion conductivity portion 32 is lower than the ion conductivity C1 of the high ion conductivity portion 31, and thus it is more difficult to conduct a lithium ion in the low ion conductivity portion 32 than in the high ion conductivity portion 31.

In this case, when excess lithium ions are discharged from the cathode layer 10 in the non-facing region R2, it is difficult for the excess lithium ions to reach a portion of the anode layer 20 in the vicinity of the non-facing region R2, such that it is difficult for a large amount of lithium ions including the excess lithium ions to be supplied to the anode layer 20. Accordingly, since the anode layer 20 need not occlude the large amount of lithium ions, a phenomenon in which a lithium ion which is not occluded into the anode layer 20 is unintentionally precipitated hardly occurs.

As a result, since a precipitate T is unlikely to attach to a portion of the anode layer 20 in the vicinity of the non-facing region R2, a possibility that the cathode layer 10 and the anode layer 20 are short-circuited due to the presence of the precipitate T decreases. Therefore, in the solid-state battery of the present technology, as the possibility that a short circuit occurs decreases, normal charging and discharging operation can be continuously performed while suppressing occurrence of a short circuit, thereby making it possible to improve safety.

In particular, in the process of manufacturing the solid-state battery of the present technology, as described above, the cathode terminal 50 is formed by using the cathode terminal slurry containing the ion conductivity adjusting material, such that in the process of forming the cathode terminal 50, the low ion conductivity portion 32 having the ion conductivity C2 lower than the ion conductivity C1 is formed together with the high ion conductivity portion 31 having the ion conductivity C1.

In this case, there is no need to form the low ion conductivity portion 32 in a process separate from the process of forming the cathode terminal 50, and thus an increase of the number of processes required to manufacture the solid-state battery is avoided. In addition, only a simple operation in which a portion (portion 1ZP1) of the laminate precursor 1Z is immersed in the cathode terminal slurry containing the ion conductivity adjusting material needs to be performed in order to form the low ion conductivity portion 32. Therefore, it is possible to easily manufacture the solid-state battery with improved safety. However, the low ion conductivity portion 32 may also be formed in a process separate from a process in which the high ion conductivity portion 31 is formed. Further, the low ion conductivity portion 32 may be formed by using a method other than the method in which the cathode terminal slurry containing the ion conductivity adjusting material is used.

[Other Actions and Effects]

Furthermore, in the solid-state battery of the present technology, when the low ion conductivity portion 32 contains a different type of specific alkali metal element from the electrode reactant ion (the ion of the alkali metal element) and the high ion conductivity portion 31 does not contain the specific alkali metal element, the ion conductivity C2 becomes sufficiently lower than the ion conductivity C1, thereby making it possible to achieve an even greater effect.

In this case, when the electrode reactant ion is a lithium ion and the low ion conductivity portion 32 contains the specific alkali metal element such as sodium or the like, a high battery capacity is guaranteed and the ion conductivity C2 becomes sufficiently lower than the ion conductivity C1, thereby making it possible to achieve an even greater effect.

Further, when the ion conductivity C1 is $10^{-4}$ S/cm to $10^{-6}$ S/cm and the ion conductivity C2 is $10^{-7}$ S/cm or less, the occurrence of the short circuit is suppressed while carrying out a smooth and sufficient electrode reaction (charge and discharge reaction), thereby making it possible to achieve an even greater effect.

1-6. Modified Example

The configuration of the solid-state battery of the present technology can be appropriately changed.

Specifically, in FIG. 1, the position of the boundary between the high ion conductivity portion 31 and the low ion conductivity portion 32 coincides with the position of the boundary between the facing region R1 and the non-facing region R2.

Figure 17:
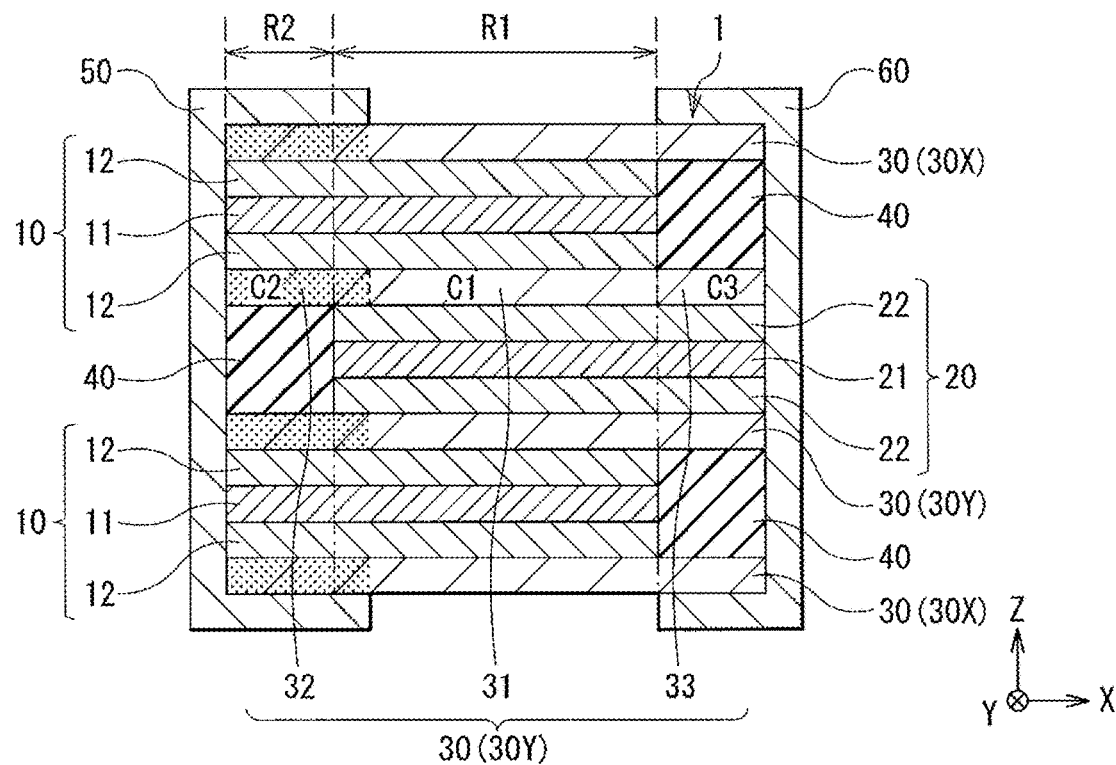
FIG. 17 is a sectional view illustrating a modified example relating to the configuration of the solid-state battery according to the embodiment of the present technology.

However, the position of the boundary between the high ion conductivity portion 31 and the low ion conductivity portion 32 may be, for example, shifted to the right side (a side adjacent to the anode terminal 60) with respect to the position of the boundary between the facing region R1 and the non-facing region R2 as illustrated in FIG. 17 corresponding to FIG. 1. That is, the low ion conductivity portion 32 may extend up to part of the facing region R1, in other words, a range in which the low ion conductivity portion 32 is formed may be expanded up to part of the facing region R1.

Figure 18:
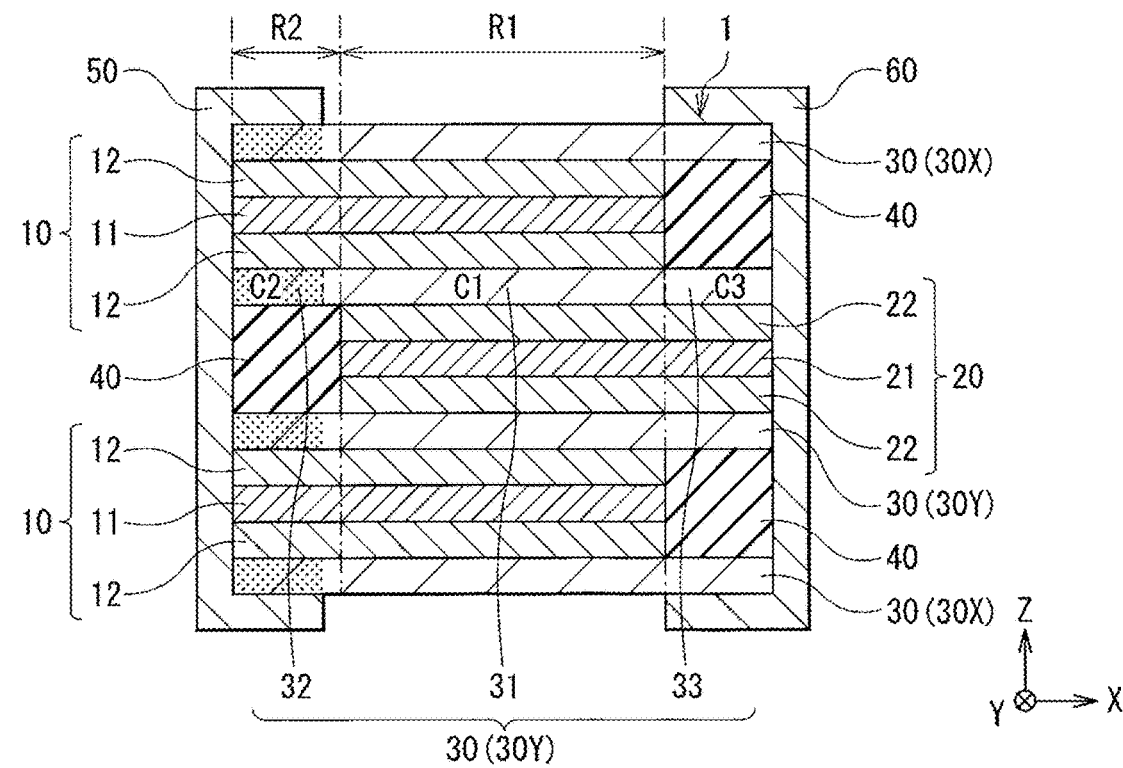
FIG. 18 is a sectional view illustrating another modified example relating to the configuration of the solid-state battery according to the embodiment of the present technology.

Alternatively, the position of the boundary between the high ion conductivity portion 31 and the low ion conductivity portion 32 may be, for example, shifted to the left side (a side adjacent to the cathode terminal 50) with respect to the position of the boundary between the facing region R1 and the non-facing region R2 as illustrated in FIG. 18 corresponding to FIG. 1.

Even in these cases, supply of a large amount of lithium ions from the cathode layer 10 to the anode layer 20 is suppressed by using the low ion conductivity portion 32 compared with the case where the solid electrolyte layer 30 does not include the low ion conductivity portion 32 (see FIG. 16), and thus the same effect can be obtained.

In order to shift the position of the boundary between the high ion conductivity portion 31 and the low ion conductivity portion 32 to the right or the left, for example, in the process of forming the cathode terminal 50, conditions such as immersing amount (immersing depth), immersing time, and the like at the time of immersing the laminate precursor 1Z in the cathode terminal slurry containing the ion conductivity adjusting material may be changed. When the immersing amount and the immersing time are increased, the position of the boundary between the high ion conductivity portion 31 and the low ion conductivity portion 32 is more likely to be shifted to the right side. Meanwhile, when the immersing amount and the immersing time are decreased, the position of the boundary between the high ion conductivity portion 31 and the low ion conductivity portion 32 is more likely to be shifted to the left side.

Particularly, in a case of shifting the position of the boundary between the high ion conductivity portion 31 and the low ion conductivity portion 32, it is preferable that the position of the boundary between the high ion conductivity portion 31 and the low ion conductivity portion 32 be shifted to the right side. This is because movement of lithium ions from the cathode layer 10 to the anode layer 20 becomes difficult in the non-facing region R1 compared with the case where the position of the boundary between the high ion conductivity portion 31 and the low ion conductivity portion 32 is shifted to the left side, and thus it becomes markedly difficult for the precipitate T to be generated. Further, this is because in the process of manufacturing the solid-state battery, when the position of the boundary between the high ion conductivity portion 31 and the low ion conductivity portion 32 is shifted to the right side in advance, a possibility that the position of the boundary between the high ion conductivity portion 31 and the low ion conductivity portion 32 is unintentionally shifted to the left side due to an error in the immersing amount or the like is decreased, and thus it is possible to stably suppress generation of the precipitate T.

However, in a case of shifting the position of the boundary between the high ion conductivity portion 31 and the low ion conductivity portion 32 to the right side, it is preferable that an amount of shifting not be excessively large. This is because in a case where the amount of shifting is excessively large, the amount of moved lithium ions is decreased due to a decrease in the area of a portion where the cathode layer 10 and the anode layer 20 face each other, and thus there is a possibility that battery capacity is decreased.

2. Use of Solid-State Battery

Next, an application example of the solid-state battery described above will be described.

Use of the solid-state battery is not particularly limited as long as it is used for a mechanism, a device, an appliance, an apparatus, a system (an aggregate of a plurality of devices and the like), or the like which can use the solid-state battery as a power supply for driving, as a power storage source for power accumulation, or the like. The solid-state battery used as the power supply may be a main power supply or an auxiliary power supply. The main power supply is a power supply which is preferentially used regardless of a presence or an absence of another power supply. The auxiliary power supply may be, for example, a power supply usable instead of the main power supply, or a power supply switched from the main power supply as necessary. In a case of using the solid-state battery as the auxiliary power supply, the type of main power supply is not limited to the solid-state battery.

Possible uses of the solid-state battery are, for example, as follows. The solid-state battery is used for an electronic device (including a portable electronic device) such as a video camera, a digital still camera, a mobile phone, a notebook personal computer, a cordless phone, a headphone stereo, a portable radio, a portable television, a portable information terminal, or the like. The solid-state battery is used for a portable household appliance such as an electric shaver or the like. The solid-state battery is used for a storage apparatus such as a backup power supply, a memory card, or the like. The solid-state battery is used for an electric tool such as an electric drill, an electric saw, or the like. The solid-state battery is used for a battery pack mounted as a detachable power supply in a notebook personal computer or the like. The solid-state battery is used for an electronic medical device such as a pacemaker, a hearing aid, or the like. The solid-state battery is used for an electric motor vehicle such as an electric car (including a hybrid car) or the like. The solid-state battery is used for a power storage system such as a household battery system in which power is accumulated as a precaution for an emergency. Naturally, the solid-state battery may be used for other purposes other than those described above.

In particular, it is effective to apply the solid-state battery to a battery pack, an electric motor vehicle, a power storage system, an electric tool, an electronic device, and the like. This is because excellent battery characteristics are required for such application, and it is possible to effectively improve performance by using the solid-state battery of the present technology. Note that the battery pack is a power supply using the solid-state battery. As the battery pack, a single battery or an assembled battery may be used as described below. The electric motor vehicle is a vehicle which operates (travels) using the solid-state battery as a driving power supply, and as described above, may be a car (such as a hybrid car or the like) including another driving source in addition to the solid-state battery. The power storage system is a system using the solid-state battery as a power storage source. For example, in a household power storage system, power is accumulated in the solid-state battery which is the power storage source, and it is thus possible to use the power to power a household electrical appliance or the like. An electric tool is a tool having a movable portion (for example, a drill or the like), and the movable portion is powered by the solid-state battery as a driving power supply. The electronic device is a device which performs various functions by using the solid-state battery as a driving power supply (power supply source).

Here, some application examples of the solid-state battery will be specifically described. Note that configurations of the application examples described below are only examples and can thus be appropriately changed.

2-1. Battery Pack (Single Battery)

Figure 19:
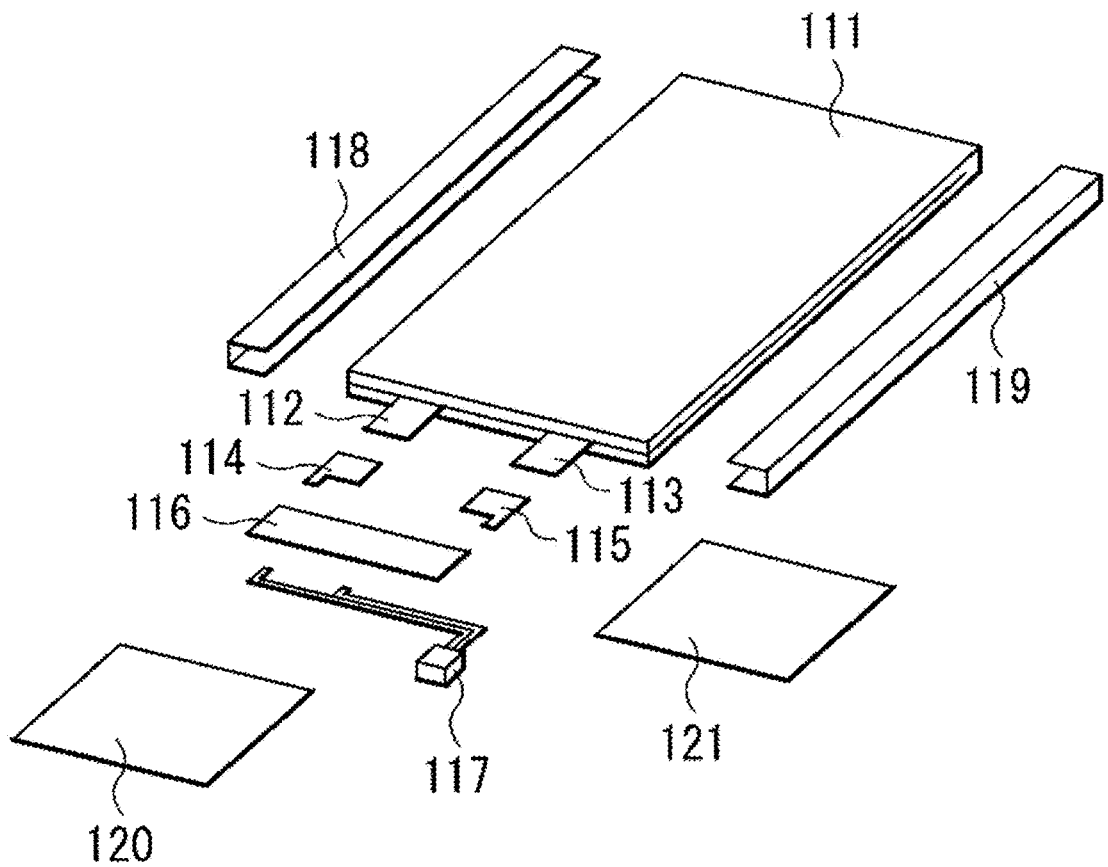
FIG. 19 is a perspective view illustrating a configuration of an application example (battery pack: single battery) of the solid-state battery.
Figure 20:
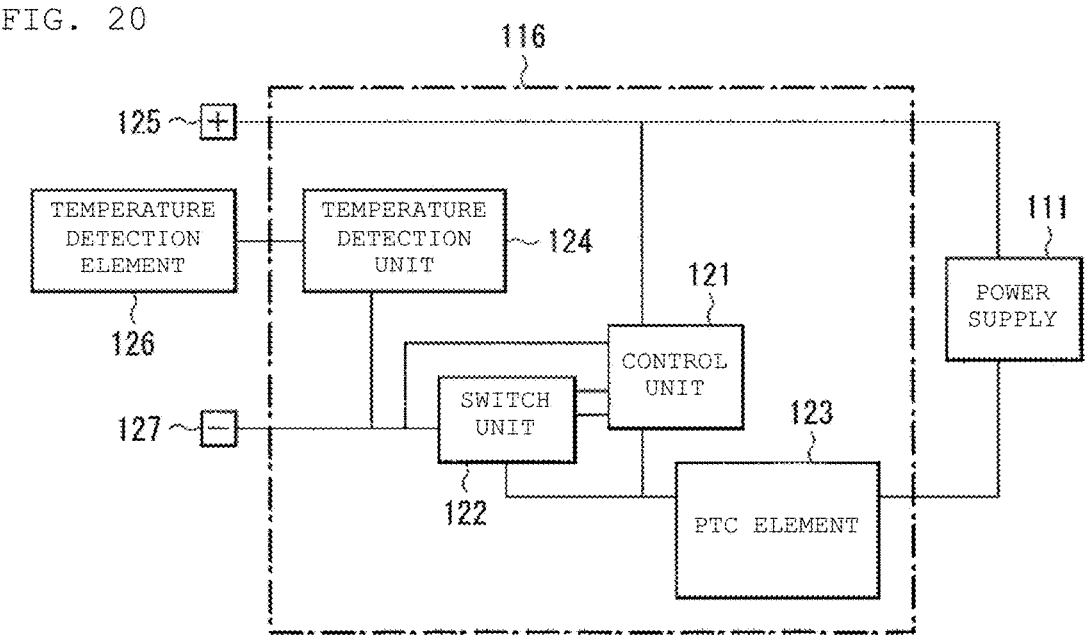
FIG. 20 is a block diagram illustrating a configuration of the battery pack illustrated in FIG. 19.

FIG. 19 illustrates a perspective configuration of a battery pack using a single battery, and FIG. 20 illustrates a block configuration of the battery pack illustrated in FIG. 19. Note that FIG. 19 illustrates an exploded state of the battery pack.

The battery pack described here is a simple battery pack (i.e., soft pack) using one solid-state battery of the present technology, and is mounted in, for example, an electronic device or the like represented by a smartphone. The battery pack includes, for example, a power supply 111 which is a solid-state battery, and a circuit board 116 connected to the power supply 111, as illustrated in FIG. 19. A cathode lead 112 and an anode lead 113 are attached to the power supply 111.

Adhesive tapes 118 and 119 which constitute a pair are attached to corresponding side surfaces of the power supply 111, respectively. A protection circuit module (PCM) is formed on the circuit board 116. The circuit board 116 is connected to the cathode 112 through a tab 114 and is connected to the anode lead 113 through a tab 115. Further, the circuit board 116 is connected to a lead wire 117 with a connector for external connection. Note that the circuit board 116 is protected by a label 120 and an insulating sheet 121 in a state in which the circuit board 116 is connected to the power supply 111. By attaching the label 120, the circuit board 116, the insulating sheet 121, and the like are fixed.

Further, the battery pack includes, for example, the power supply 111 and the circuit board 116, as illustrated in FIG. 20. The circuit board 116 includes, for example, a control unit 121, a switch unit 122, a PTC element 123, and a temperature detection unit 124. The power supply 111 can be connected to the outside through a cathode terminal 125 and an anode terminal 127, and is charged and discharged through the cathode terminal 125 and the anode terminal 127. The temperature detection unit 124 detects a temperature using a temperature detection terminal (i.e., T terminal) 126.

The control unit 121 controls operation (including a use state of the power supply 111) of the entire battery pack. The control unit 121 includes, for example, a central processing unit (CPU), a memory, and the like.

For example, when a battery voltage reaches an overcharge detection voltage, the control unit 121 causes a charge current not to flow in a current path of the power supply 111 by disconnecting the switch unit 122. Further, for example, when a large current flows during charging, the control unit 121 cuts off the charge current by disconnecting the switch unit 122.

On the other hand, for example, when the battery voltage reaches an overdischarge detection voltage, the control unit 121 causes a discharge current not to flow in the current path of the power supply 111 by disconnecting the switch unit 122. Further, for example, when a large current flows during discharging, the control unit 121 cuts off the discharge current by disconnecting the switch unit 122.

Note that the overcharge detection voltage is not particularly limited, and is, for example, 4.2 V±0.05 V. Note that the overdischarge detection voltage is not particularly limited, and is, for example, 2.4 V±0.1 V.

The switch unit 122 switches the use state of the power supply 111, that is, connection or disconnection between the power supply 111 and an external device, according to an instruction from the control unit 121. The switch unit 122 includes, for example, a charge control switch, a discharge control switch, and the like. Each of the charge control switch and the discharge control switch is, for example, a semiconductor switch such as a metal oxide semiconductor field effect transistor (MOSFET) or the like. Note that the charge and discharge currents are detected based on, for example, a turn-on resistance of the switch unit 122.

The temperature detection unit 124 measures a temperature of the power supply 111 and outputs a temperature measurement result to the control unit 121. The temperature detection unit 124 includes, for example, a temperature detection element such as a thermistor or the like. Note that the temperature measurement result obtained by the temperature detection unit 124 is used, for example, when the control unit 121 performs a charge and discharge control at the time of abnormal heat generation, when the control unit 121 performs correction processing at the time of calculating the remaining capacity, or the like.

Note that the circuit board 116 may not include the PTC element 123. In this case, the circuit board 116 may be separately provided with the PTC element.

2-2. Battery Pack (Assembled Battery)

Figure 21:
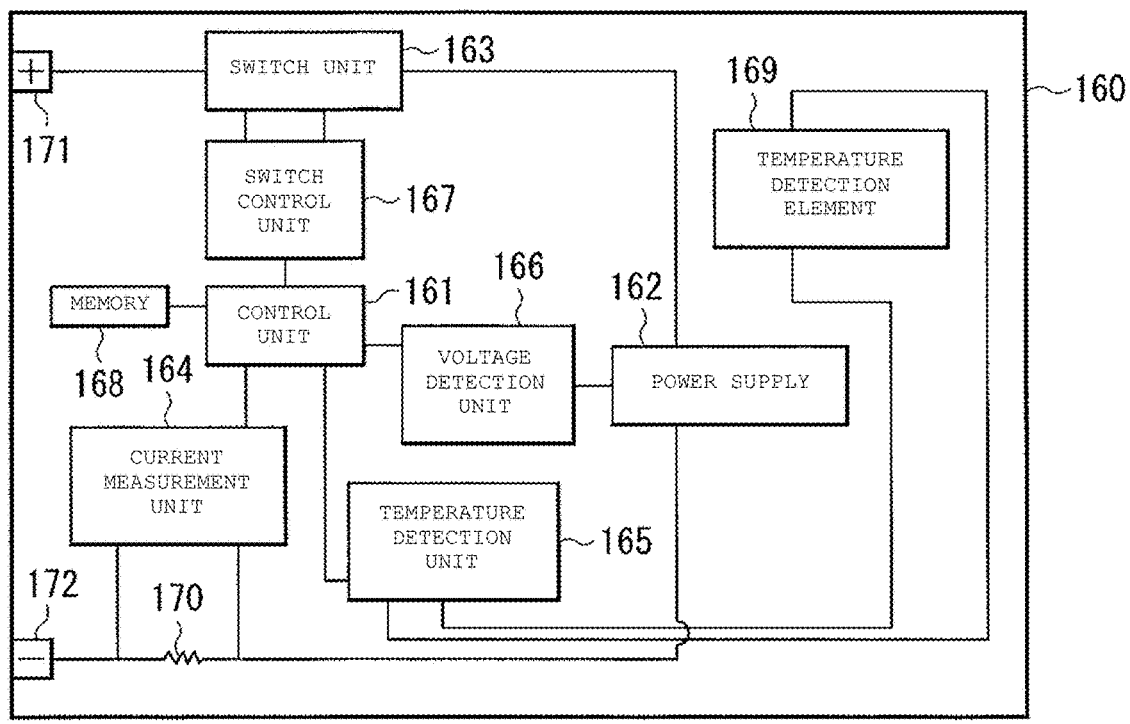
FIG. 21 is a block diagram illustrating a configuration of an application example (battery pack: assembled battery) of the solid-state battery.

FIG. 21 illustrates a block configuration of a battery pack using an assembled battery.

The battery pack includes, in a housing 160, for example, a control unit 161, a power supply 162, a switch unit 163, a current measurement unit 164, a temperature detection unit 165, a voltage detection unit 166, a switch control unit 167, a memory 168, a temperature detection element 169, a current detection resistor 170, a cathode terminal 171, and an anode terminal 172. The housing 160 includes, for example, a plastic material or the like.

The control unit 161 controls operation (including a use state of the power supply 162) of the entire battery pack. The control unit 161 includes, for example, a CPU and the like. The power supply 162 is an assembled battery including two or more solid-state batteries of the present technology, and the two or more solid-state batteries may be connected to each other in series, in parallel, or in series and in parallel. As an example, the power supply 162 includes six solid-state batteries connected to one another in two parallels and three series.

The switch unit 163 switches the use state of the power supply 162, that is, connection or disconnection between the power supply 162 and an external device, according to an instruction from the control unit 161. The switch unit 163 includes, for example, a charge control switch, a discharge control switch, a charge diode, a discharge diode, and the like. Each of the charge control switch and the discharge control switch is, for example, a semiconductor switch such as a metal oxide semiconductor field effect transistor (MOS-FET) or the like.

The current measurement unit 164 measures a current using the current detection resistor 170 and outputs a current measurement result to the control unit 161. The temperature detection unit 165 measures a temperature using the temperature detection element 169 and outputs a temperature measurement result to the control unit 161. The temperature measurement result is used, for example, when the control unit 161 performs a charge and discharge control at the time of abnormal heat generation, when the control unit 161 performs correction processing at the time of calculating the remaining capacity, or the like. The voltage detection unit 166 measures a voltage of the solid-state battery in the power supply 162 and supplies a result of measuring the analog-digital converted voltage to the control unit 161.

The switch control unit 167 controls operation of the switch unit 163 according to a signal input from each of the current measurement unit 164 and the voltage detection unit 166.

For example, when a battery voltage reaches an overcharge detection voltage, the switch control unit 167 causes a charge current not to flow in a current path of the power supply 162 by disconnecting the switch unit 163 (charge control switch). Thus, in the power supply 162, only discharging can be performed through the discharge diode. Note that the switch control unit 167 cuts off the charge current, for example, when a large current flows during charging.

Further, for example, when a battery voltage reaches an overdischarge detection voltage, the control unit 167 causes a discharge current not to flow in the current path of the power supply 162 by disconnecting the switch unit 163 (discharge control switch). Thus, in the power supply 162, only charging can be performed through the charge diode. Note that the switch control unit 167 cuts off the discharge current, for example, when a large current flows during discharging.

Note that the overcharge detection voltage is not particularly limited, and is, for example, 4.2 V±0.05 V. Note that the overdischarge detection voltage is not particularly limited, and is, for example, 2.4 V±0.1 V.

The memory 168 includes, for example, an electrically erasable and programmable read only memory (EEPROM) or the like, which is a non-volatile memory. For example, numerical values calculated by the control unit 161, information (for example, internal resistance in an initial state, or the like) on the solid-state battery measured in a manufacturing process step, and the like, are stored in the memory 168. Note that if a full charge capacity of the solid-state battery is stored in the memory 168, the control unit 161 can grasp information such as the remaining capacity or the like of the solid-state battery.

The temperature detection element 169 measures a temperature of the power supply 162 and outputs a temperature measurement result to the control unit 161. The temperature detection element 169 includes, for example, a thermistor or the like.

Each of the cathode terminal 171 and the anode terminal 172 is a terminal connected to an external device (for example, a notebook personal computer or the like) operable using the battery pack, an external device (for example, a charger or the like) usable for charging the battery pack, and the like. The power source 162 is charged and discharged through the cathode terminal 171 and the anode terminal 172.

2-3. Electric Motor Vehicle

Figure 22:
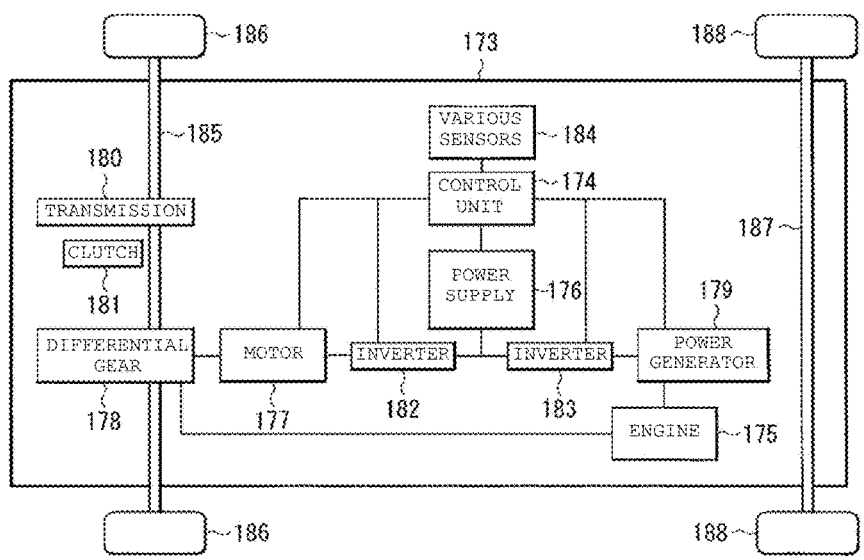
FIG. 22 is a block diagram illustrating a configuration of an application example (electric motor vehicle) of the solid-state battery.

FIG. 22 illustrates a block configuration of a hybrid vehicle as an example of the electric motor vehicle.

The electric motor vehicle includes, in a metal housing 173, for example, a control unit 174, an engine 175, a power supply 176, a driving motor 177, a differential gear 178, a power generator 179, a transmission 180, a clutch 181, inverters 182 and 183, and various sensors 184. In addition, the electric motor vehicle includes, for example, a front-wheel driving shaft 185 and front wheels 186, and a rear-wheel driving shaft 187 and rear wheels 188 connected to the differential gear 178 and the transmission 180.

The electric motor vehicle can travel by using, for example, any one of the engine 175 and the motor 177 as a driving source. The engine 175 is a main driving source and for example, is a gasoline engine or the like. In a case where the engine 175 is used as the driving source, for example, a driving force (rotational force) of the engine 175 is transferred to the front wheels 186 and the rear wheels 188 through the differential gear 178, the transmission 180, and the clutch 181 which are the driving unit. Since the rotational force of the engine 175 is transferred to the power generator 179, the power generator 179 generates alternating current (AC) power by using the rotational force, and the AC power is converted into direct current (DC) power through the inverter 183, such that the DC power is accumulated in the power supply 176. Meanwhile, in a case where the motor 177 which is a converting unit is used as the driving source, since power (DC power) supplied from the power supply 176 is converted into AC power through the inverter 182, the motor 177 is driven by using the AC power. The driving force (rotational force) converted from the power by the motor 177 is transferred to, for example, the front wheels 186 and the rear wheels 188 through the differential gear 178, the transmission 180, and the clutch 181 which are the driving unit.

When the electric motor vehicle decelerates through a brake mechanism, a resistance at the time of the deceleration is transferred as the rotational force to the motor 177. Therefore, the motor 177 may generate the AC power by using the rotational force. Since the AC power is converted into the DC power through the inverter 182, it is preferable that the DC regenerative power be accumulated in the power supply 176.

The control unit 174 controls operation of the entire electric motor vehicle. The control unit 174 includes, for example, a CPU and the like. The power supply 176 includes one, or two or more solid-state batteries of the present technology. The power supply 176 may be connected to an external power supply and may accumulate power by receiving power supplied from the external power supply. The various sensors 184 are used to, for example, control revolutions per minute (RPM) of the engine 175 and control an opening degree (throttle opening degree) of a throttle valve. The various sensors 184 include, for example, one, or two or more of a speed sensor, an acceleration sensor, an engine RPM sensor, and the like.

Although a case where the electric motor vehicle is the hybrid vehicle has been described as an example, the electric motor vehicle may also be a vehicle (electric car) operated by using only the power supply 176 and the motor 177, without using the engine 175.

2-4. Power Storage System

Figure 23:
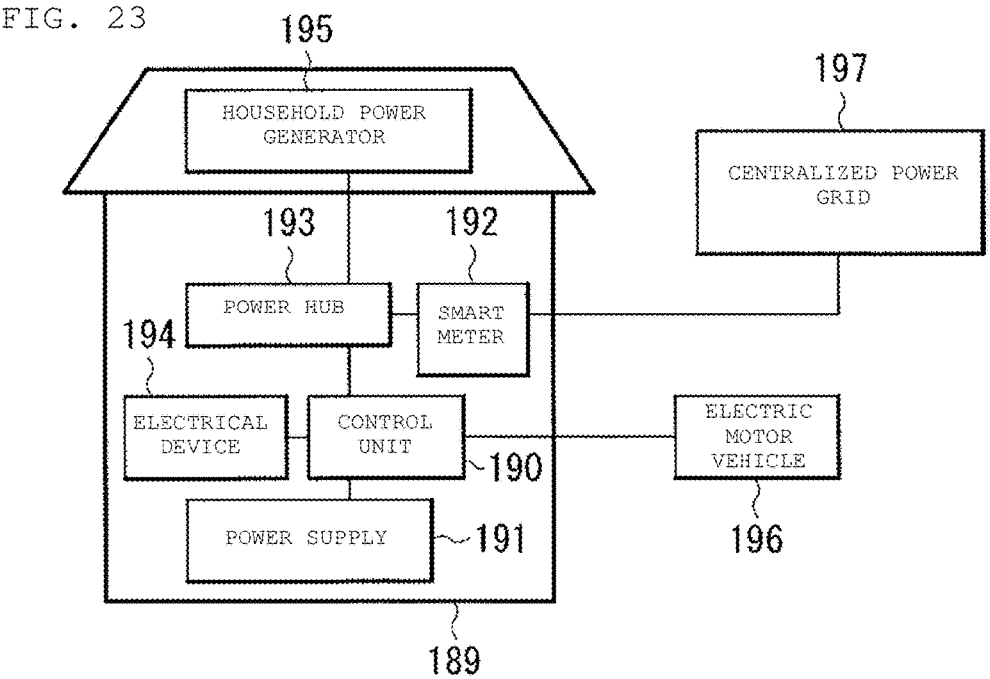
FIG. 23 is a block diagram illustrating a configuration of an application example (power storage system) of the solid-state battery.

FIG. 23 illustrates a block configuration of a power storage system.

The power storage system includes, for example, a control unit 190, a power supply 191, a smartmeter 192, and a power hub 193 in a house 189 such as general housing, commercial buildings, and the like.

Here, the power supply 191 can be connected to, for example, an electrical device 194 installed in the house 189 and connected to an electric motor vehicle 196 parked outside the house 189. In addition, the power supply 191 can be connected to, for example, a household power generator 195 installed in the house 189 through the power hub 193 and connected to an external centralized power grid 197 through the smartmeter 192 and the power hub 193.

The electrical device 194 includes, for example, one, or two or more household appliances, and examples of the household appliances include a refrigerator, an air conditioner, a television, a water heater, and the like. The household power generator 195 includes, for example, one, two or more of a solar power generator, a wind power generator, and the like. The electric motor vehicle 196 includes, for example, one, two or more of an electric vehicle, an electric motorcycle, a hybrid vehicle, and the like. The centralized power grid 197 includes, for example, one, two or more of a thermoelectric power plant, a nuclear power plant, a hydroelectric power plant, a wind power plant, and the like.

The control unit 190 controls operation (including a use state of the power supply 191) of the entire power storage system. The control unit 190 includes, for example, a CPU and the like. The power supply 191 includes one, or two or more solid-state batteries of the present technology. The smartmeter 192 is, for example, a network-compatible wattmeter installed in the house 189 which is a power demand side and can perform communication with a power supply side. Accordingly, the smartmeter 192 controls, for example, a balance between demand and supply of power in the house 189 while performing communication with the outside, thereby enabling stable and highly efficient supply of energy.

In the power storage system, for example, power is accumulated in the power supply 191, the power being supplied from the centralized power grid 197 which is an external power supply through the smartmeter 192 and the power hub 193, and power is accumulated in the power supply 191, the power being supplied from the household power generator 195 which is an independent power supply through the power hub 193. Since the power accumulated in the power supply 191 is supplied to the electrical device 194 and the electric motor vehicle 196 according to an instruction of the control unit 190, the electrical device 194 can be operated and the electric motor vehicle 196 can be charged. That is, the power storage system is a system which enables accumulation and supply of power in the house 189 by using the power supply 191.

The power accumulated in the power supply 191 can be used as necessary. For this reason, for example, the power supplied from the centralized power grid 197 can be accumulated in the power supply 191 in the night time when electricity charge is low, and the power accumulated in the power supply 191 can be used in the day time when electricity tariff is high.

It should be noted that the power storage system described above may be installed for each house (each household) or may be installed for a plurality of houses (a plurality of households).

2-5. Electric Tool

Figure 24:
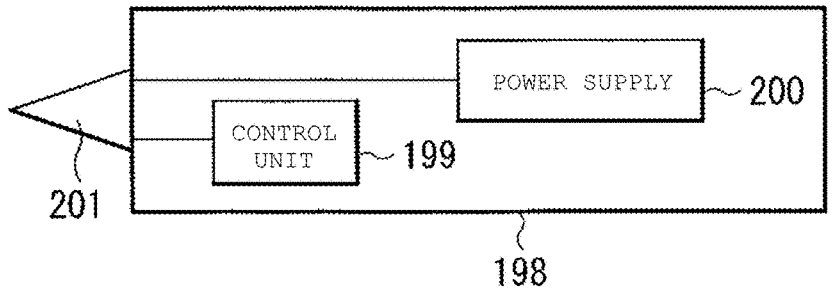
FIG. 24 is a block diagram illustrating a configuration of an application example (electric tool) of the solid-state battery.

FIG. 24 illustrates a block configuration of an electric tool.

The electric tool described herein is, for example, an electric drill. The electric tool includes, for example, a control unit 199 and a power supply 200 in a tool body 198. For example, a drilling unit 201 which is a movable portion is operably (rotatably) attached to the tool body 198.

The tool body 198 is formed of, for example, a plastic material or the like. The control unit 199 controls operation (including a use state of the power supply 200) of the entire electric tool. The control unit 199 includes, for example, a CPU and the like. The power supply 200 includes one, or two or more solid-state batteries of the present technology. The control unit 199 controls supply of power from the power supply 200 to the drilling unit 201 according to an operation of an operating switch.

3. Application Example of Solid-State Battery

Next, an application example of the solid-state battery described above will be described. The solid-state battery can be applied to, for example, a device and the like described below. However, a configuration of devices and the like described below is only an example.

Application Example 1: Printed Circuit Board

Figure 25:
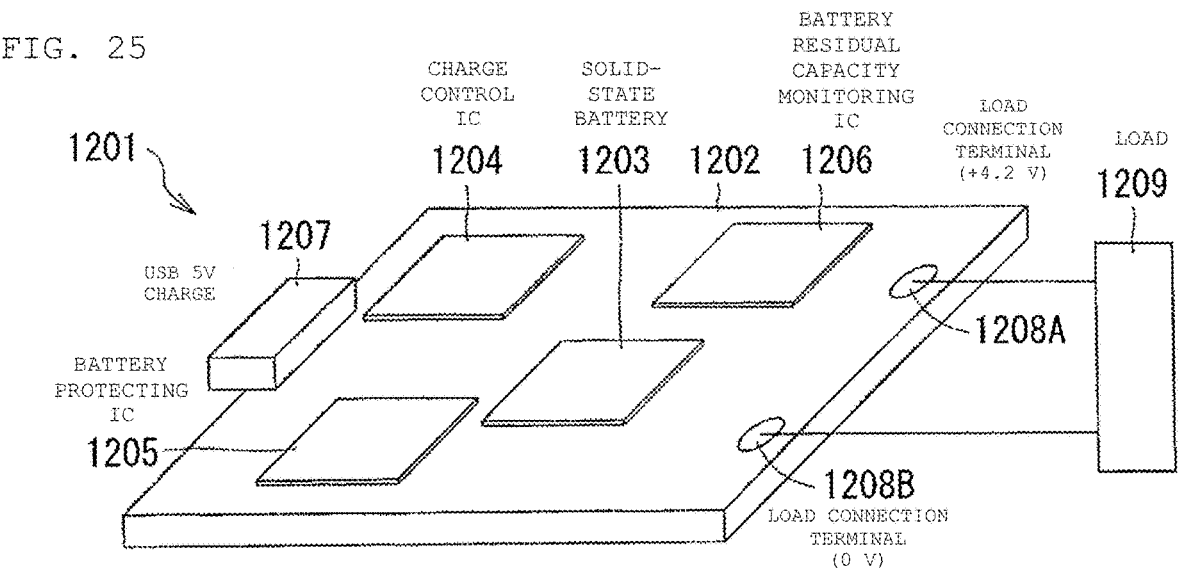
FIG. 25 is a block diagram illustrating a configuration of an application example (printed circuit board) of the solid-state battery.

FIG. 25 illustrates a block configuration of a printed circuit board. The solid-state battery is, for example, mounted on a printed circuit board (PCB) 1202 together with a charging circuit and the like as illustrated in FIG. 25. The solid-state battery 1203 and an electronic circuit such as a charging circuit or the like can be mounted on the PCB 1202 by using, for example, a reflow process. Hereinafter, the PCB 1202 on which the solid-state battery 1203 and the electronic circuit such as a charging circuit or the like are mounted will be referred to as a "battery module 1201". The battery module 1201 has, for example, a card shape, and is used as a portable card-type mobile battery.

For example, a charge control integrated circuit (IC) 1204, a battery protecting IC 1205, and a battery residual capacity monitoring IC 1206 are provided on the PCB 1202. The battery protecting IC 1205 controls the charging and discharging operation to prevent a charge voltage from being excessively large at the time of charging and discharging, prevent excess current from flowing due to a short circuit of a load, and prevent overdischarging.

For example, a universal serial bus (USB) interface 1207 is attached to the PCB 1202. The solid-state battery 1203 is, for example, charged using power supplied through the USB interface 1207. In this case, a charging operation is controlled by the charge control IC 1204. The PCB 1202 is further provided with, for example, load connection terminals 1208A and 1208B, and predetermined power (for example, a voltage of 4.2 V) is supplied to a load 1209 through the load connection terminals 1208A and 1208B. A battery residual capacity of the solid-state battery 1203 is monitored by, for example, the battery residual capacity monitoring IC 1206 and can be checked from the outside through, for example, a display panel or the like. Note that the USB interface 1207 may be used for load connection.

Specific examples of the load 1209 described above are as follows.

A. Wearable device (a sports watch, a watch, a hearing aid, or the like)

B. Internet of things (IoT) terminal (a sensor network terminal or the like)

C. Amusement device (a portable game terminal, a game controller, or the like)

D. IC board-embedded battery (a real time clock IC or the like)

E. Environment-friendly Power generation device (a power storage element for solar power generation, thermoelectric generation, vibration power generation, and the like)

Application Example 2: Universal Credit Card

In recent days, many users carry a plurality of credit cards. However, as the number of credit cards is increased, a risk such as loss, theft, or the like is increased, which is problematic. Therefore, a card in which functions of a plurality of credit cards and loyalty cards, and the like are integrated, that is, a so-called universal credit card has been practically used. In the universal credit card, for example, information such as card numbers, expiration dates, and the like of various credit cards and loyalty cards can be recorded, and thus when one universal credit card is put in a wallet or the like, it is possible to select a desired card as necessary and use the selected card.

Figure 26:
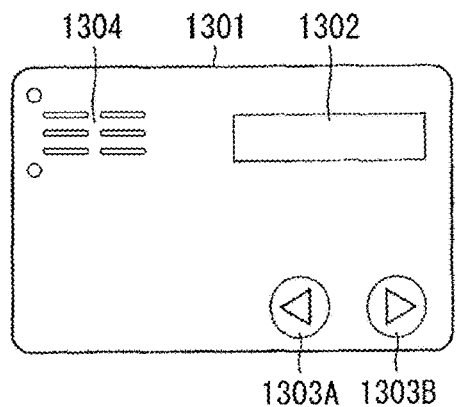
FIG. 26 is a plan view illustrating a configuration of an application example (universal credit card) of the solid-state battery.

FIG. 26 illustrates a plane configuration of a universal credit card 1301. In the universal credit card 1301, for example, an IC chip, the solid-state battery, and the like are embedded and a display 1302 which consumes little power and directional keys 1303A and 1303B for operation, and the like are provided. Note that, for example, a charging terminal 1304 is provided on a surface of the universal credit card 1301.

The user, for example, can operate the directional keys 1303A and 1303B while viewing the display 1302 to specify a credit card or the like loaded in the universal credit card 1301 in advance. In a case where a plurality of credit cards are loaded in the universal credit card 1301 in advance, for example, information indicating each credit card is displayed on the display 1302, such that the user can specify a desired credit card by operating the directional keys 1303A and 1303B. The user can specify or designate a credit card to be used and use the universal credit card 1301 in the same way as that of the conventional credit card. Note that the application of the solid-state battery in the universal credit card 1301 is only an example here, thus the solid-state battery may also be applied to various electronic cards other than the universal credit card 1301.

Application Example 3: Wristband-Type Electronic Device

Examples of a wearable terminal include a wristband-type electronic device. In particular, a wristband-type activity meter is called a smart band, and a user can acquire data about an activity of a person such as the number of steps, a moving distance, calories burned, hours of sleep, a heart rate, and the like only by wearing the wristband-type activity meter on the person's arm. In this case, the data acquired by the wristband-type activity meter can be managed by using a smartphone or the like. Note that the wristband-type activity meter may have a function of transmitting and receiving an e-mail. In this case, the wristband-type activity meter may have, for example, a function of notifying the user of reception of an e-mail by using a light emitting diode (LED) lamp, vibration, or the like.

Figure 27:
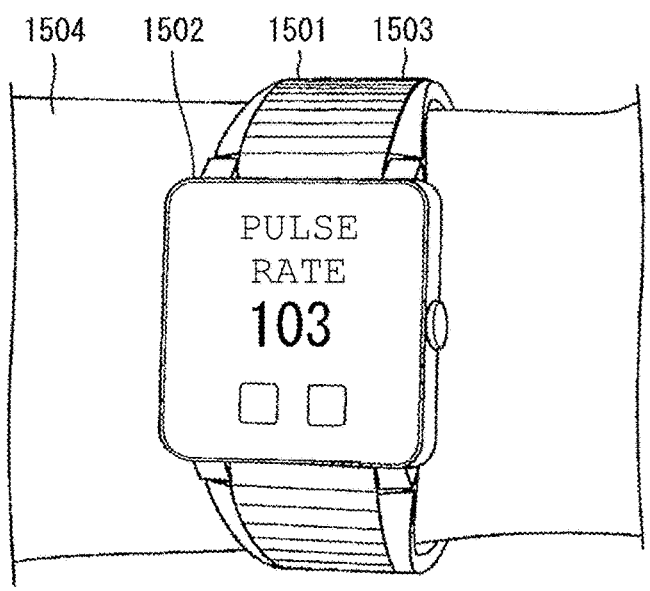
FIG. 27 is a perspective view illustrating a configuration of an application example (wristband-type activity meter) of the solid-state battery.
Figure 28:
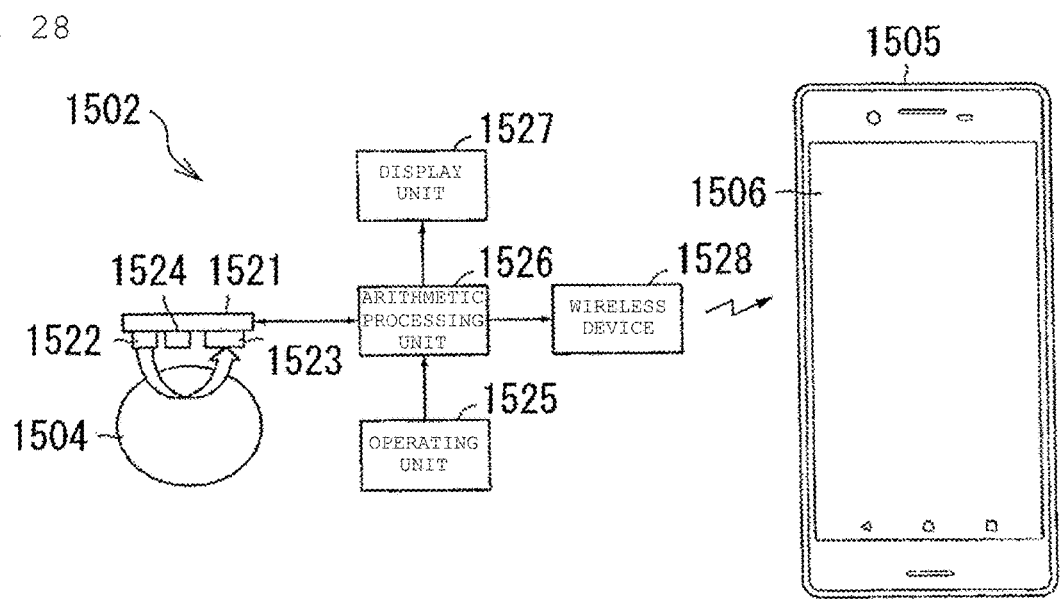
FIG. 28 is a block diagram illustrating a configuration of main units of the wristband-type activity meter illustrated in FIG. 27.

FIG. 27 illustrates a perspective configuration of a wristband-type activity meter 1501 which measures a pulse rate, and FIG. 28 illustrates a block configuration of main units (a main body portion 1502) of the wristband-type activity meter 1501 illustrated in FIG. 27. The wristband-type activity meter 1501 described herein is a wristband-type measuring device which measures a pulse rate of a subject by using an optical method. The wristband-type activity meter 1501 includes, for example, the main body portion 1502 and a band 1503 as illustrated in FIG. 27 and is mounted on an arm (wrist) 1504 of the subject like a watch by using the band 1503. The main body portion 1502, for example, irradiates the arm 1504 (a portion where a pulse rate can be measured) of the subject with measuring light having a predetermined wavelength and then measures a pulse rate based on an intensity of light returning from the arm 1504 of the subject.

The main body portion 1502 includes, for example, a board 1521, an LED 1522, a light receiving IC 1523, a light shielding body 1524, an operating unit 1525, an arithmetic processing unit 1526, a display unit 1527, and a wireless device 1528, as illustrated in FIG. 28. The LED 1522, the light receiving IC 1523, and the light shielding body 1524 are provided on, for example, the board 1521. The LED 1522 is, for example, controlled by the light receiving IC 1523 to irradiate the arm 1504 of the subject with the measuring light having the predetermined wavelength as described above.

The light receiving IC 1523 receives light returning from the arm 1504 after the arm 1504 is irradiated with the measuring light. The light receiving IC 1523, for example, generates a digital measuring signal indicating light intensity and supplies the measuring signal to the arithmetic processing unit 1526.

The light shielding body 1524 is, for example, provided on the board 1521 and disposed between the LED 1522 and the light receiving IC 1523. The light shielding body 1524 prevents the measuring light emitted from the LED 1522 from being directly incident on the light receiving IC 1523.

The operating unit 1525 includes, for example, various operating members such as a button, a switch, and the like, and is provided on, for example, a surface of the main body portion 1502. The operating unit 1525 is used by the user in order to operate the wristband-type activity meter 1501 and supplies, to the arithmetic processing unit 1526, a signal indicating a content corresponding to an operation by the user.

The arithmetic processing unit 1526 performs, for example, arithmetic processing for measuring the pulse rate of the subject based on the measuring signal supplied from the light receiving IC 1523. The arithmetic processing unit 1526 supplies a result of measuring the pulse rate to the display unit 1527 and the wireless device 1528.

The display unit 1527 is, for example, a display device such as a liquid crystal display (LCD) or the like, and is provided on the surface of the main body portion 1502. The display unit 1527 displays information such as the result of measuring the pulse rate of the subject.

The wireless device 1528, for example, transmits the result of measuring the pulse rate of the subject to an external device by using wireless communication according to a predetermined protocol. For example, in FIG. 28, the wireless device 1528, for example, transmits the result of measuring the pulse rate of the subject to a smartphone 1505, such that the measurement result is displayed on a screen 1506 of the smartphone 1505. Data of the measurement result are managed by using, for example, the smartphone 1505, and thus it is possible to access the measurement result by using the smartphone 1505 and store the measurement result in a server on a network. As a communication protocol of the wireless device 1528, any protocol can be adopted. Note that the light receiving IC 1523 can also measure a pulse rate at a portion (for example, a finger, an ear lobe, or the like) other than the arm 1504 of the subject.

In the wristband-type activity meter 1501 described above, it is possible to accurately measure a pulse wave and a pulse rate of the subject while removing an influence of a body motion by using signal processing by the light receiving IC 1523. For example, even in a case where the subject takes intense exercise such as running or the like, the wristband-type activity meter 1501 can accurately measure the pulse wave and the pulse rate of the subject. Further, for example, even in a case where the subject is wearing the wristband-type activity meter 1501 for a long time, the wristband-type activity meter 1501 can continuously measure the pulse wave and the pulse rate accurately while removing an influence of a body motion of the subject.

Further, in a case of reducing an amount of calculation, it is possible to reduce power consumption of the wristband-type activity meter 1501. As a result, for example, the subject can wear the wristband-type activity meter 1501 for a long time to measure the pulse wave and the pulse rate without frequently charging a battery, replacing a battery, or the like.

Note that, for example, a thin battery as a power supply is provided in the band 1503. The wristband-type activity meter 1501 includes, for example, an electronic circuit of a main body and a battery pack, and the battery pack is, for example, detachable. The electronic circuit described here is a circuit embedded in the main body portion 1502 described above. In a case of using a solid-state battery as the battery described above, the solid-state battery of the present technology can be applied.

Figure 29:
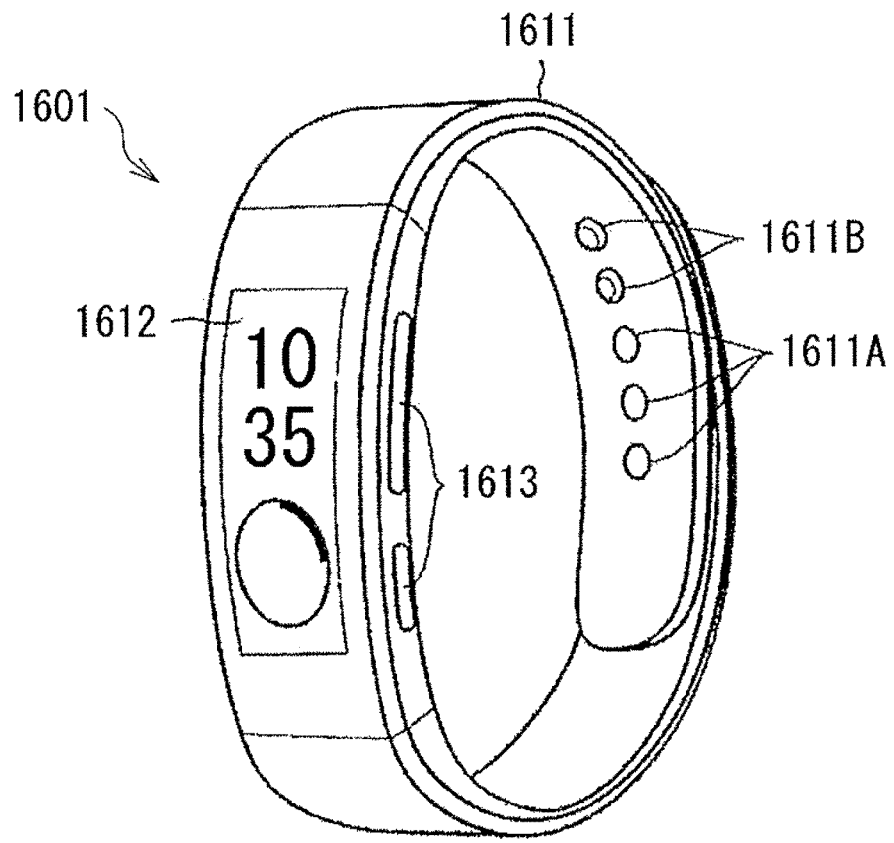
FIG. 29 is a perspective view illustrating a configuration of an application example (wristband-type electronic device) of the solid-state battery.

FIG. 29 illustrates a perspective configuration of a wristband-type electronic device 1601 (hereinafter, simply referred to as an "electronic device 1601"). The electronic device 1601 is, for example, a watch-type device which can be worn on a body of a person, and is a so-called wearable device. The electronic device 1601 includes, for example, a band portion 1611 mounted on an arm, a display device 1612 which displays a number, a character, a pattern, and the like, and an operating button 1613 as illustrated in FIG. 29. The band portion 1611 includes, for example, a plurality of hole portions 1611A, and a protrusion portion 1611B protruding from an inner circumferential surface (a surface contacting the arm when the electronic device 1601 is mounted).

When the electronic device 1601 is used, the electronic device 1601 is mounted on the arm such that the band portion 1611 is curved in a substantially circular shape and the protrusion portion 1611B is inserted into the hole portion 1611A. It is possible to adjust a diameter of the curved band portion 1611 in response to a thickness of the arm by changing a position of the hole portion 1611A into which the protrusion portion 1611B is to be inserted. Meanwhile, when the electronic device 1601 is not used, the protrusion portion 1611B is removed from the hole portion 1611A, such that the band portion 1611 is stored in a substantially planar state. The solid-state battery is, for example, provided in the entire band portion 1611.

Application Example 4: Smart Watch

A smart watch has the same or similar appearance as or to an appearance (design) of the conventional watch, and is used by being mounted on an arm of a user similarly to the watch. The smart watch has a function of notifying the user of various messages such as reception of a phone call and an e-mail, or the like based on information displayed on a display. In addition, a smart watch having a function such as electronic money, an activity meter, or the like has also been suggested. In the smart watch, various pieces of information are displayed on the display. The smart watch can perform, for example, near field communication based on Bluetooth (registered trademark) or the like with a communication terminal (a smartphone or the like) to be in cooperation with a function, contents, or the like of the communication terminal or the like.

As a type of the smart watch, a smart watch including a plurality of segments connected in a band shape, a plurality of electronic components accommodated in the plurality of segments, and a flexible circuit board has been suggested. The circuit board connects the plurality of electronic components accommodated in the plurality of segments to one another and is mounted in at least one segment in a meandering shape. In a case where the flexible circuit board which can form a meandering shape is used, a stress is not applied even when the band is curved, such that cutting of the circuit is prevented. Further, since the electronic circuit components can be embedded in the segments of the band attached to a main body of the smart watch, rather than in a housing configuring the main body of the smart watch, there is no need to change a configuration of the main body of the smart watch. Therefore, it is possible to design the smart watch so as to have the same design as that of the conventional watch. Further, the smart watch of the present application example can perform notification indicating reception of an e-mail, a phone call, or the like, record a log such as a motion history of the user, make a phone call, and the like. In addition, the smart watch functions as, for example, a contactless IC card, and thus can perform payment, verification, and the like in a non-contact manner.

A smart watch of the present application example has, for example, a circuit component, which performs communication processing and notification processing, embedded in a metal band. In order to guarantee a function as an electronic device while reducing a thickness of the metal band, the band is formed by connecting a plurality of segments to one another, and for example, a circuit board, a vibration motor, a battery, an acceleration sensor, and the like are accommodated in the segments. The circuit board, the vibration motor, the battery, the acceleration sensor, and the like accommodated in the segments are connected to one another through, for example, a flexible printed circuit board (FPC).

Figure 30:
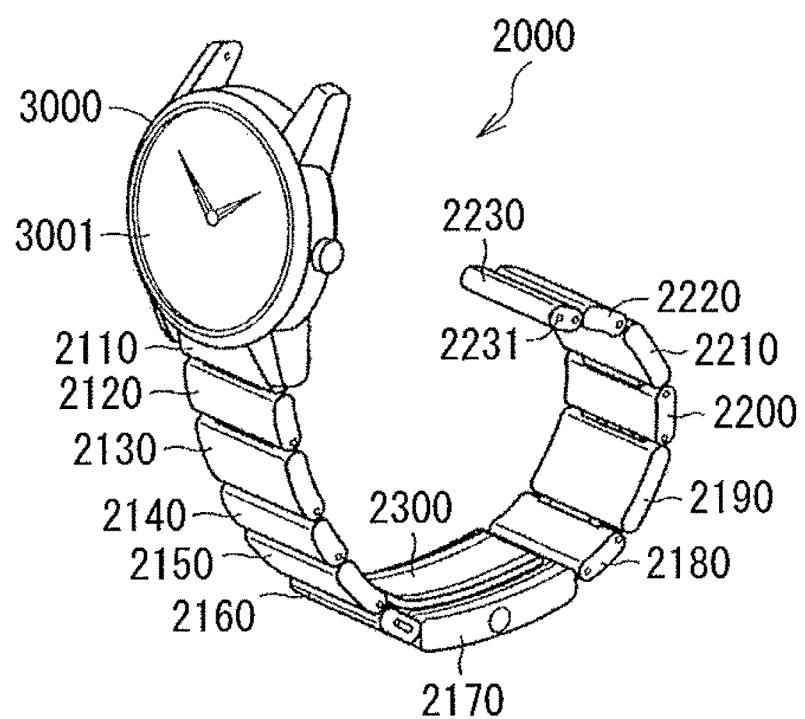
FIG. 30 is an exploded perspective view illustrating a configuration of an application example (smart watch) of the solid-state battery.

FIG. 30 illustrates an exploded perspective configuration of a smart watch. A band-type electronic device 2000 is a metal band attached to a watch main body 3000 and is mounted on an arm of a user. The watch main body 3000 includes, for example, a dial 3100 which displays a time. However, the watch main body 3000 may include, for example, a liquid crystal display or the like which electronically displays a time, instead of the dial 3100.

The band-type electronic device 2000 described here is a plurality of segments 2110 to 2230 connected to one another. The segment 2110 is attached to a band attaching hole on one side of the watch main body 3000, and the segment 2230 is attached to a band attaching hole on the other side of the watch main body 3000. Each of the segments 2110 to 2230 is formed of, for example, metal.

[Internal Configuration of Segment]

Figure 31:
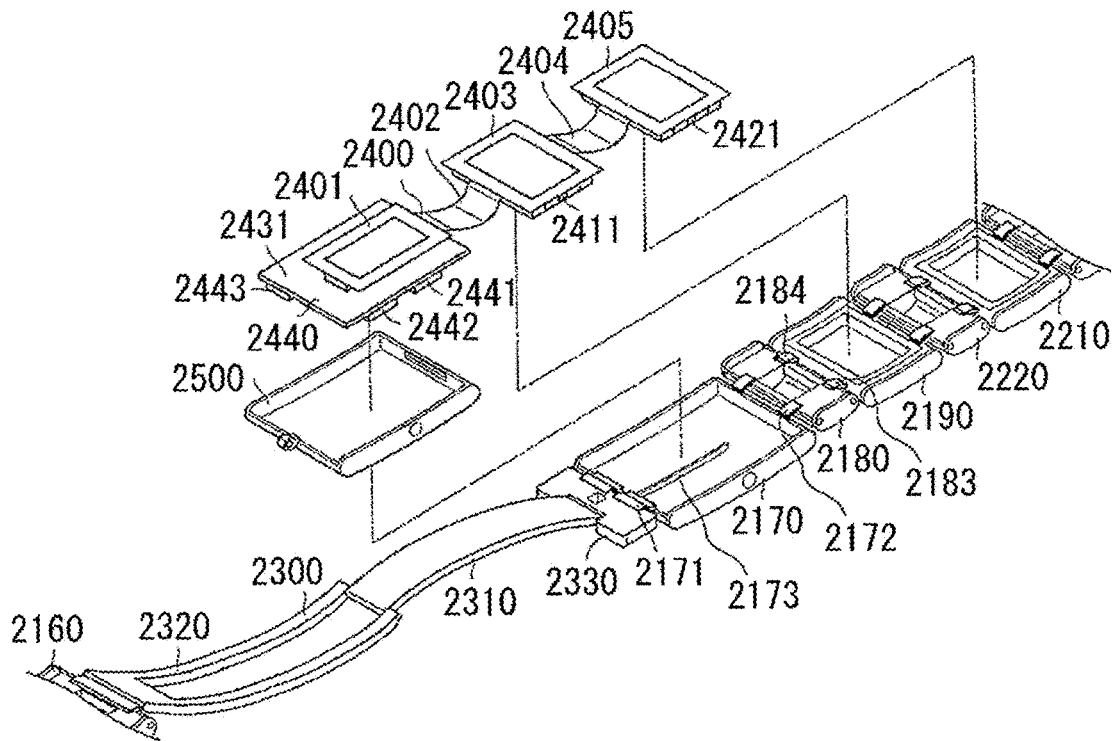
FIG. 31 is a perspective view illustrating part of an internal configuration of an application example (band-type electronic device) of the solid-state battery.

FIG. 31 illustrates part of an internal configuration of the band-type electronic device 2000, specifically, illustrates five segments 2170, 2180, 2190, 2200, and 2210. In the band-type electronic device 2000, a flexible circuit board 2400 is accommodated in five consecutive segments 2170 to 2210. Various electronic components are disposed in the segment 2170, and batteries 2411 and 2421 including a solid-state battery are accommodated in the segments 2190 and 2210, respectively. These electronic components and the like are electrically connected to one another through the flexible circuit board 2400. The segment 2180 disposed between the segment 2170 and the segment 2190 has a relatively small size, and the flexible circuit board 2400 in a meandering state is disposed in the segment 2180. The flexible circuit board 2400 is accommodated in the segment 2180 in a state of being sandwiched by a waterproofing member. Note that each of the segments 2170 to 2210 has a waterproofing structure.

[Circuit Configuration of Smart Watch]

Figure 32:
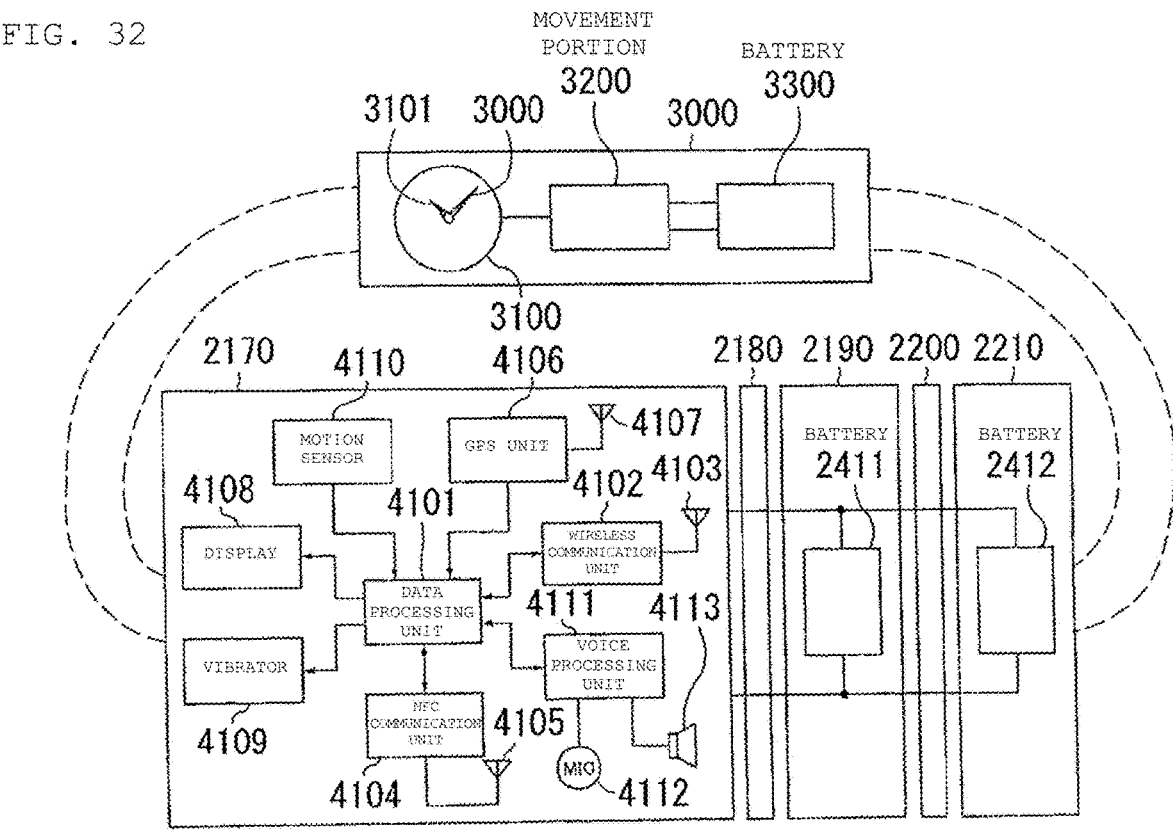
FIG. 32 is a block diagram illustrating a configuration of an application example (band-type electronic device) of the solid-state battery.

FIG. 32 illustrates a block configuration of the band-type electronic device 2000 described above. A circuit mounted in the band-type electronic device 2000 is independent from the watch main body 3000. The watch main body 3000 includes, for example, a movement portion 3200 which rotates hands provided on the dial 3100, and a battery 3300 is connected to the movement portion 3200. The movement portion 3200 and the battery 3300 are accommodated in the housing of the watch main body 3000.

In the band-type electronic device 2000 connected to the watch main body 3000, the electronic components are accommodated in three segments 2170, 2190, and 2210, respectively. In the segment 2170, for example, a data processing unit 4101, a wireless communication unit 4102, a near field communication (NFC) communication unit 4104, and a global positioning system (GPS) unit 4106 are accommodated. The wireless communication unit 4102, the NFC communication unit 4104, and the GPS unit 4106 are connected to antennas 4103, 4105, and 4107, respectively. The antennas 4103, 4105, and 4107 are disposed in the vicinity of a slit 2173 to be described later, the slit 2173 being provided in the segment 2170.

The wireless communication unit 4102 performs, for example, near field communication with another terminal by using a protocol of Bluetooth (registered trademark). The NFC communication unit 4104 performs, for example, wireless communication with a near reader/writer by using a protocol of NFC. The GPS unit 4106 is a positioning unit which measures a current position by receiving radio waves transmitted from a system (satellite) which is called a global positioning system (GPS). Data acquired by each of the wireless communication unit 4102, the NFC communication unit 4104, and the GPS unit 4106 are supplied to a data processing unit 4101.

In the segment 2170, for example, a display 4108, a vibrator 4109, a motion sensor 4110, and a voice processing unit 4111 are accommodated. The display 4108 and the vibrator 4109 function as a notification unit which notifies the user who is a person wearing the band-type electronic device 2000 of various pieces of information. The display 4108 includes a plurality of light emitting diodes, and notifies a user of various pieces of information by using lighting, flickering, and the like of the light emitting diodes. The plurality of light emitting diodes are, for example, accommodated in the slit 2173 provided in the segment 2170, and the user is notified of information such as reception of a phone call, reception of an e-mail, or the like by using lighting, flickering, or the like of the plurality of light emitting diodes. The display 4108 can display, for example, information such as a character, a number, or the like. The vibrator 4109 is a member which vibrates the segment 2170. The band-type electronic device 2000 notifies the user of information such as reception of a phone call, reception of an e-mail, and the like through vibration of the segment 2170 using the vibrator 4109.

The motion sensor 4110 detects a motion of the user on which the band-type electronic device 2000 is mounted. The motion sensor 4110 is, for example, an acceleration sensor, a gyro sensor, an electronic compass, a pressure sensor, or various other sensors. However, the segment 2170 may have a sensor other than the motion sensor 4110 embedded therein. In detail, for example, a bio sensor which detects a pulse rate or the like of the user on which the band-type electronic device 2000 is mounted may be used. The voice processing unit 4111 is connected to, for example, a microphone 4112 and a speaker 4113 and performs call processing with a communicating party connected using wireless communication through the wireless communication unit 4102. Further, the voice processing unit 4111 can perform processing for a voice input operation.

The battery 2411 is embedded in the segment 2190 and the battery 2421 is embedded in the segment 2210. Each of the batteries 2411 and 2421 includes the solid-state battery, and supplies power for driving to a circuit accommodated in the segment 2170. The circuit accommodated in the segment 2170 and the batteries 2411 and 2421 are connected to each other through the flexible circuit board 2400 (see FIG. 31). Note that the segment 2170 includes, for example, a terminal for charging each of the batteries 2411 and 2421. An electronic component other than the batteries 2411 and 2421 may be disposed in each of the segments 2190 and 2210. Each of the segments 2190 and 2210 may include, for example, a circuit which controls charging and discharging of the batteries 2411 and 2421.

Application Example 5: Glass-Type Terminal

A glass-type terminal described below is a display device which can display information such as a text, a symbol, an image, or the like while superimposing the information on a scene in front of a user. That is, a light-weight and thin image display device display module which is dedicated to a transmission glass-type terminal is mounted on the glass-type terminal. Representative examples of the glass-type terminal include a head-mounted display (HMD) and the like.

The display device includes, for example, an optical engine and a hologram light guide plate. The optical engine emits video light such as an image, a text, and the like by using a micro display lens, and the video light emitted from the optical engine is incident on the hologram light guide plate. The hologram light guide plate is, for example, a transparent plate having opposite end portions to which hologram optical elements are assembled, respectively. The hologram light guide plate propagates the video light emitted from the optical engine through a very thin transparent plate (for example, having a thickness of 1 mm) to allow the video light to reach eyes of an observer. As a result, for example, a lens (including protective plates in front of and behind the light guide plate) having a transmittivity of 85% and a thickness of 3 mm is implemented. By using the glass-type terminal, it is possible to view a score of a player and a team while watching sports games and view travel information for a travel destination.

Figure 33:
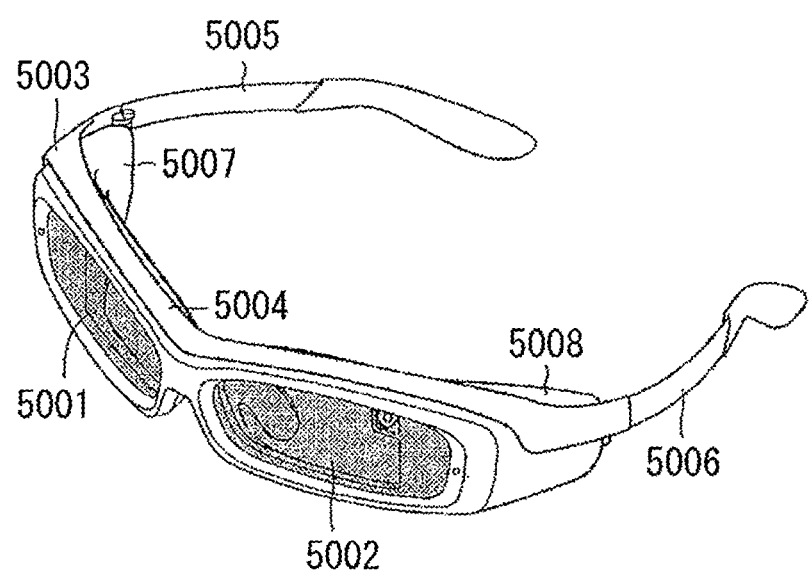
FIG. 33 is a perspective view illustrating a configuration of an application example (glass-type terminal) of the solid-state battery.

FIG. 33 illustrates a perspective configuration of the glass-type terminal. In the glass-type terminal, for example, an image display unit has a glass shape as illustrated in FIG. 33. That is, the glass-type terminal includes, for example, a frame 5003 for holding a right image display unit 5001 and a left image display unit 5002 in front of the eyes of the user, similarly to general glasses. The frame 5003 includes, for example, a front portion 5004 disposed in front of the observer, and two temple portions 5005 and 5006 pivotably attached to opposite ends of the front portion 5004 through hinges. The frame 5003 includes, for example, metal, an alloy, plastic, a combination thereof, or the like, and is formed of the same material as that of a frame of the general glasses. Note that the glass-type terminal may also include, for example, a headphone portion.

The right image display unit 5001 and the left image display unit 5002 are disposed so as to be disposed in front of the right eye and the left eye of the user, respectively. The temple portions 5005 and 5006 hold the right image display unit 5001 and the left image display unit 5002 in a state in which the glass-type terminal is mounted on a head of the user. A right display driving unit 5007 is disposed at an inner side of the temple portion 5005 in the vicinity of a portion where the front portion 5004 and the temple portion 5005 are connected to each other, and a left display driving unit 5008 is disposed at an inner side of the temple portion 5006 in the vicinity of a portion where the front portion 5004 and the temple portion 5006 are connected to each other.

In the frame 5003, for example, an acceleration sensor, a gyro sensor, an electronic compass, a microphone, a speaker, and the like are embedded in addition to the solid-state battery. In the frame 5003, for example, an image capturing device is attached, and the glass-type terminal can capture, for example, a still image and a moving image. In addition, the frame 5003 may include, for example, a controller connected through a wireless or wired interface. In the controller, for example, a touch sensor, various buttons, a speaker, a microphone, and the like are provided, and the controller has, for example, a function of interconnection with a smartphone. The controller utilizes, for example, a GPS function of the smartphone, such that it is possible to provide information according to a situation of the user.

EXAMPLES

Examples of the present technology will be described.

Experimental Examples 1 to 6

The solid-state battery illustrated in FIG. 1 was manufactured by sequentially performing in this order, for example, a process of forming the cathode green sheet 100, a process of forming the anode green sheet 200, a process of forming the laminate precursor 1P, a process of forming the cathode terminal 50, and a process of forming the anode terminal 60, as described below.

[Process of Forming Cathode Green Sheet]

In a case of forming the cathode green sheet 100, first, an electrolyte slurry, an insulating slurry, a cathode active material slurry, and a cathode current collector slurry were prepared.

In a case of preparing the electrolyte slurry, a solid electrolyte ($Li_2O$—$SiO_2$—$B_2O_3$ which is oxide glass having a molar ratio of 54:11:35 (($Li_2O$:$SiO_2$:$B_2O_3$)), an electrolyte binder (acrylic resin), and a solvent (butyl acetate) were mixed with each other and the mixture was then stirred (stirring time=4 hours) using zirconia balls (diameter=5 mm). In this case, a mixing ratio (weight ratio) of the solid electrolyte to the electrolyte binder was 70:30 (solid electrolyte:electrolyte binder), and a concentration of solid matter in the mixture was 30% by weight.

In a case of preparing the insulating slurry, an insulating material (alumina particles, AHP300 produced by Nippon Light Metal Company, Ltd.) and the solid electrolyte (the oxide glass described above) were mixed with each other. In this case, a mixing ratio (weight ratio) of the insulating material to the solid electrolyte was 50:50 (insulating material:solid electrolyte). Then, the mixture, an insulating binder (acrylic resin), and a solvent (butyl acetate) were mixed with one another, and the mixture was then stirred (stirring time=4 hours) by using zirconia balls (diameter=5 mm). In this case, a mixing ratio (weight ratio) of the mixture to the insulating binder was 70:30 (mixture:insulating binder), and a concentration of solid matter in the mixture was 30% by weight.

In a case of preparing the cathode active material slurry, a cathode active material (lithium cobalt oxide ($LiCoO_2$) produced by Sigma-Aldrich, Inc.), the solid electrolyte (the oxide glass described above), a cathode binder (acrylic resin), and a solvent β-terpineol) were mixed with one another, and the mixture was stirred (rotation speed=3000 rpm and stirring time=1 hour) by using a stirrer (a rotation-revolution mixer "Awatori Rentaro" manufactured by THINKY CORPORATION). In this case, a mixing ratio (weight ratio) of the cathode active material to the solid electrolyte was 50:50 (cathode active material:solid electrolyte), and a mixing ratio (weight ratio) of the cathode active material and the solid electrolyte to the cathode binder was 80:20 (cathode active material and solid electrolyte:cathode binder). Further, a concentration of solid matter in the mixture was 60% by weight.

In a case of preparing the cathode current collector slurry, a conductive material (graphite "KS6" produced by Imerys Graphite & Carbon), the solid electrolyte (the oxide glass described above), a cathode current collector binder (acrylic resin), and a solvent (β-terpineol) were mixed with one another, and the mixture was stirred (rotation speed=3000 rpm and stirring time=1 hour) by using a stirrer (a rotation-revolution mixer "Awatori Rentaro" manufactured by THINKY CORPORATION). In this case, a mixing ratio (weight ratio) of the conductive material to the solid electrolyte was 50:50 (conductive material:solid electrolyte), and a mixing ratio (weight ratio) of the conductive material and the solid electrolyte to the cathode current collector binder was 80:20 (conductive material and solid electrolyte: cathode current collector binder). Further, a concentration of solid matter in the mixture was 60% by weight.

Next, the electrolyte slurry was applied on one surface of the substrate 70 (a release film manufactured by Toray Industries, Inc.), and the electrolyte slurry was then dried (drying temperature=80° C. and drying time=10 minutes) to form the solid electrolyte layer 30. Next, the insulating slurry was applied on a surface of the solid electrolyte layer 30 by using a screen printing method, and the insulating slurry was then dried (drying temperature=80° C. and drying time=10 minutes) to form the insulating layer 40.

Then, the cathode active material layer 12 was formed on the solid electrolyte layer 30 by using the screen printing method. The cathode active material slurry was dried under the condition that a drying temperature is 80° C. and a drying time is 5 minutes. Then, the cathode current collector layer 11 was formed on the cathode active material layer 12 by using the screen printing method. The cathode current collector slurry was dried under the condition that a drying temperature is 80° C. and a drying time is 5 minutes. Finally, the cathode active material layer 12 was formed on the cathode current collector layer 11 by using the screen printing method to form the cathode layer 10. The cathode current collector slurry was dried under the condition as described above. As a result, the cathode green sheet 100 including the solid electrolyte layer 30, the insulating layer 40, and the cathode layer 10 was obtained.

[Process of Forming Anode Green Sheet]

In a case of forming the anode green sheet 200, first, an electrolyte slurry, an insulating slurry, an anode active material slurry, and an anode current collector slurry were prepared. However, preparing procedures of the electrolyte slurry and the insulating slurry are as described above, and a preparing procedure of the anode current collector slurry is the same as that of the cathode current collector slurry.

In a case of preparing the anode active material slurry, an anode active material (natural graphite), a solid electrolyte (the oxide glass described above), an anode binder (acrylic resin), and a solvent (β-terpineol) were mixed with one another, and the mixture was stirred (rotation speed=3000 rpm and stirring time=1 hour) by using a stirrer (a rotation-revolution mixer "Awatori Rentaro" manufactured by THINKY CORPORATION). In this case, a mixing ratio (weight ratio) of the anode active material to the solid electrolyte was 50:50 (anode active material:solid electrolyte), and a mixing ratio (weight ratio) of the anode active material and the solid electrolyte to the cathode binder was 80:20 (anode active material and solid electrolyte:cathode binder). Further, a concentration of solid matter in the mixture was 60% by weight.

Then, the electrolyte slurry was applied on one surface of the substrate 80 (a release film manufactured by Toray Industries, Inc.), and the electrolyte slurry was dried (drying temperature=80° C. and drying time=10 minutes) to form the solid electrolyte layer 30. Next, the insulating slurry was applied on a surface of the solid electrolyte layer 30 by using a screen printing method, and the insulating slurry was then dried to form the insulating layer 40. The electrolyte slurry and the insulating slurry were each dried under the condition as described above.

Then, the anode active material layer 22 was formed on the solid electrolyte layer 30 by using the screen printing method. The anode active material slurry was dried under the condition that a drying temperature was 80° C. and a drying time was 5 minutes. Then, the anode current collector layer 21 was formed on the anode active material layer 22 by using the screen printing method. The anode current collector slurry was dried under the condition that a drying temperature was 80° C. and a drying time was 5 minutes. Finally, the anode active material layer 22 was formed on the anode current collector layer 21 by using the screen printing method to form the anode layer 20. The anode current collector slurry was dried under the condition as described above. As a result, the anode green sheet 200 including the solid electrolyte layer 30, the insulating layer 40, and the anode layer 20 was obtained.

[Process of Forming Laminate Precursor]

In a case of forming the laminate precursor 1Z, first, the substrate 70 was separated and removed from the cathode green sheet 100, and the substrate 80 was separated and removed from the anode green sheet 200. Then, the cathode green sheet 100, the anode green sheet 20, and the cathode green sheet 100 were sequentially laminated in this order to obtain a laminate. Next, an electrolyte slurry was applied on a surface of the cathode green sheet 100 which is the uppermost layer in the laminate, and the electrolyte slurry was then dried (drying temperature=80° C. and drying time=10 minutes). By doing so, the solid electrolyte layer 30 was formed and as a result, the laminate precursor 1Z including the cathode layer 10, the anode layer 20, the solid electrolyte layer 30, and the insulating layer 40 was formed. Finally, the laminate precursor 1Z was heated (heating temperature=100° C. and heating time=10 minutes).

[Process of Forming Cathode Terminal]

In a case of forming the cathode terminal 50, first, a cathode terminal slurry was prepared.

In a case of preparing the cathode terminal slurry, a conductive material (silver), a solid electrolyte (the oxide glass described above), a cathode terminal binder (acrylic resin), and a solvent (β-terpineol) were mixed with one another, and the mixture was stirred (rotation speed=3000 rpm and stirring time=1 hour) by using a stirrer (a rotation-revolution mixer "Awatori Rentaro" manufactured by THINKY CORPORATION). In this case, a mixing ratio (weight ratio) of the conductive material to the solid electrolyte was 80:20 (conductive material:solid electrolyte), and a mixing ratio (weight ratio) of the conductive material and the solid electrolyte to the cathode terminal binder was 98:2 (conductive material and solid electrolyte:cathode terminal binder). Further, a concentration of solid matter in the mixture was 60% by weight. Thereafter, an ion conductivity adjusting material was added to the mixture. The type and an added amount of the ion conductivity adjusting material were as shown in Table 1.

Next, a portion (portion 1ZP1) of the laminate precursor 1Z was immersed (immersing time=1 minute) in the cathode terminal slurry. Next, the laminate precursor 1Z was taken out from the cathode terminal slurry and the cathode terminal slurry attached to the laminate precursor 1Z was then dried (drying temperature=80° C. and drying time=10 minutes).

Finally, the cathode terminal slurry after drying was heated (heating temperature=300° C. and heating time=10 hours) and the cathode terminal slurry was then further heated (heating temperature=400° C. and heating time=30 minutes). By doing so, the cathode terminal binder was removed in the former heating process and the cathode terminal slurry was sintered in the latter heating process to form the cathode terminal 50.

In a case of forming the cathode terminal 50, in a process in which the laminate precursor 1Z is immersed in the cathode terminal slurry, the ion conductivity adjusting material contained in the cathode terminal slurry was diffused into a portion of the solid electrolyte layer 30. As a result, the high ion conductivity portion 31 having the relatively high ion conductivity C1 and the low ion conductivity portion 32 having the relatively low ion conductivity C1 were formed in the solid electrolyte layer 30.

[Process of Forming Anode Terminal]

In a case of forming the anode terminal 60, first, an anode terminal slurry was prepared. A preparing procedure of the anode terminal slurry is the same as that of the cathode terminal slurry.

Next, a portion (portion 1ZP2) of the laminate precursor 1Z was immersed (immersing time=1 minute) in the anode terminal slurry. Next, the laminate precursor 1Z was taken out from the anode terminal slurry and the anode terminal slurry attached to the laminate precursor 1Z was then dried (drying temperature=80° C. and drying time=10 minutes).

Finally, the anode terminal slurry after drying was heated (heating temperature=300° C. and heating time=10 hours) and the anode terminal slurry was then further heated (heating temperature=400° C. and heating time=30 minutes). By doing so, the anode terminal binder was removed in the former heating process and the anode terminal slurry was sintered in the latter heating process to form the anode terminal 60.

Experimental Examples 7

As shown in Table 1, the solid-state battery illustrated in FIG. 16 was manufactured in the same procedure as that of Experimental Examples 1 to 6 except that the cathode terminal 50 was formed by using a cathode terminal slurry which does not contain the ion conductivity adjusting material. In this case, the ion conductivity C1 of the ion conductivity portion 131 and the ion conductivity C2 of the ion conductivity portion 132 were the same as each other.

A charging and discharging test was performed in order to evaluate operation stabilities of the solid-state batteries (Experimental Examples 1 to 7), and results as shown in Table 1 were obtained.

In the charging and discharging test, a lead wire for carrying a current was connected to each of the cathode terminal 50 and the anode terminal 60, and the solid-state battery was then repeatedly charged and discharged, thereby enabling a short circuit occurrence situation at the time of charging to be verified. At the time of charging, charging was conducted until a voltage reached 4.2 V at a current of 0.1 C, and charging was then further conducted until a current reached 0.01 C at the voltage of 4.2 V. At the time of discharging, discharging was conducted until a voltage reached 2 V at a current of 0.1 C. "0.1 C" is a current value at which the battery capacity (theoretical capacity) is fully discharged in 10 hours. "0.01 C" is a current value at which the battery capacity is fully discharged in 100 hours.

In this case, the number (upper limit value) of cycles of charging and discharging of the solid-state battery was 50 cycles. Therefore, in a case where a short circuit did not occur even when the number of cycles of charging and discharging reaches 50 cycles, the short circuit occurrence situation was evaluated as "Did Not Occur". Whereas, in a case where a short circuit occurred before or when the number of cycles of charging and discharging reaches 50 cycles, the short circuit occurrence situation was evaluated as "Occurred".

Note that Table 1 shows ion conductivities C1 (S/cm) and C2 (S/cm) together with the short circuit occurrence situation. In a case of measuring the ion conductivities C1 and C2, in order to simplify a measuring procedure, samples having the same configurations as those of the high ion conductivity portion 31, the low ion conductivity portion 32, and the ion conductivity portions 131 and 132, respectively were formed separately from the solid-state battery, and the ion conductivities C1 and C2 were measured by using the samples. In this case, platinum (Pt, diameter=5 mm) was formed on each of opposite surfaces of the sample by using a sputtering method, and alternating current (AC) impedance measurement (frequency=$10^{+6}$ Hz to $10^{-1}$ Hz and voltage=100 mV and 1000 mV) was then performed on the sample by using an impedance measuring device (manufactured by TOYO Corporation.) to obtain a lithium ion conductivity.

TABLE 1

| Experimental Example | Ion Conductivity Adjusting Material | | Ion Conductivity C1 (S/cm) | Ion Conductivity C2 (S/cm) | Short Circuit |
|---|---|---|---|---|---|
| | Type | Added Amount | | | |
| 1 | Sodium Carbonate | 1% by Weight | $10^{-5}$ | $10^{-8}$ | Did Not Occur |
| 2 | Potassium Carbonate | 1% by Weight | $10^{-5}$ | $10^{-8}$ | Did Not Occur |
| 3 | Rubidium Carbonate | 1% by Weight | $10^{-5}$ | $10^{-8}$ | Did Not Occur |
| 4 | Cesium Carbonate | 1% by Weight | $10^{-5}$ | $10^{-8}$ | Did Not Occur |
| 5 | Francium Carbonate | 1% by Weight | $10^{-5}$ | $10^{-8}$ | Did Not Occur |
| 6 | Pure Water | 0.4% by Volume | $10^{-5}$ | $10^{-8}$ | Did Not Occur |
| 7 | — | — | $10^{-5}$ | $10^{-5}$ | Occurred |

As apparent from the results shown in Table 1, in a case (Experimental Example 7) where the solid electrolyte layer 30 does not include the high ion conductivity portion 31 or the low ion conductivity portion 32, a short circuit occurred because the ion conductivity adjusting material was not used. As a result of disassembling and examining the solid-state battery after the short circuit occurred, the precipitate T (lithium dendrite) attached to the anode layer 20 as described with reference to FIG. 16.

On the other hand, in a case (Experimental Examples 1 to 6) where the solid electrolyte layer 30 includes the high ion conductivity portion 31 and the low ion conductivity portion 32, a short circuit did not occur irrespective of the type of ion conductivity adjusting material because the ion conductivity adjusting material was used. Note that as a result of disassembling and examining the solid-state battery after the charging and discharging test ends, the precipitate T did not attach to the anode layer 20.

As can be appreciated from this, when the solid electrolyte layer 30 includes the high ion conductivity portion 31 and the low ion conductivity portion 32, occurrence of a short circuit was suppressed. As a result, safety of the solid-state battery was improved.

Hereinabove, the present technology has been described with reference to an embodiment and Examples, but the present technology is not limited to the aspects described in the embodiment and Examples, and various modifications are possible.

For example, in the embodiment and Examples, a case where the electrode reactant ion is a lithium ion has been described, but the electrode reactant ion may also be an ion other than the lithium ion. Even in this case, the solid electrolyte layer includes the high ion conductivity portion and the low ion conductivity portion, and thus it is possible to achieve the same effect.

Note that the effects described in the present specification are merely illustrative and not limitative, and other effects may be achieved.

The invention claimed is:

1. A solid-state battery comprising:
    a cathode layer which occludes and discharges an electrode reactant ion;
    an anode layer which occludes and discharges the electrode reactant ion and partially faces the cathode layer; and
    a solid electrolyte layer between the cathode layer and the anode layer and including a first ion conductivity portion in a first region in which the cathode layer and the anode layer face each other, and a second ion conductivity portion facing the cathode layer in a second region in which the cathode layer and the anode layer do not face each other, the first ion conductivity portion having an ion conductivity higher than that of the second ion conductivity portion.

2. The solid-state battery according to claim 1, wherein the electrode reactant ion is an ion of a first alkali metal element,
    the low ion conductivity portion contains at least one second alkali metal element different from the first alkali metal element, and
    the first ion conductivity portion does not contain the second alkali metal element.

3. The solid-state battery according to claim 2, wherein the electrode reactant ion is a lithium ion, and
    the second alkali metal element is at least one of sodium, potassium, rubidium, cesium, and francium.

4. The solid-state battery according to claim 2, wherein the cathode layer contains a cathode active material which occludes and discharges the electrode reactant ion, and
    the cathode active material does not contain the second alkali element as a constituent element thereof.

5. The solid-state battery according to claim 4, wherein the cathode material is a lithium-containing compound.

6. The solid-state battery according to claim 5, wherein the lithium compound is a lithium transition metal composite oxide or a lithium transition metal phosphate compound.

7. The solid-state battery according to claim 4, wherein the anode layer contains an anode active material which occludes and discharges the electrode reactant ion.

8. The solid-state battery according to claim 7, wherein the anode active material is a carbon material, a metal-based material, a lithium-containing compound, or a lithium metal.

9. The solid-state battery according to claim 1, wherein the second ion conductivity portion extends into a portion of the first region in which the cathode layer and the anode layer face each other.

10. The solid-state battery according to claim 1, wherein the first ion conductivity portion extends into a portion of the second region in which the cathode layer and the anode layer do not face each other.

11. The solid-state battery according to claim 1, wherein the ion conductivity of the first ion conductivity portion is $10^{-4}$ S/cm to $10^{-6}$ S/cm, and
    the ion conductivity of the second ion conductivity portion is $10^{-7}$ S/cm or less.

12. The solid-state battery according to claim 1, wherein the solid electrolyte layer includes a crystalline solid electrolyte.

13. The solid-state battery according to claim 1, wherein a plurality of the cathode layer, the anode layer, and the solid electrolyte layer are arranged in a laminate, and the solid state battery further comprises:
    a lowermost solid electrolyte layer on an outermost lower surface of the laminate; and
    an uppermost solid electrolyte layer on an outermost upper surface of the laminate.

14. The solid-state battery according to claim 1, further comprising:
    a cathode terminal; and
    an anode terminal spaced apart from the cathode terminal, wherein
    the cathode layer is electrically connected to the cathode terminal, extends towards the anode terminal, and is electrically isolated from the anode terminal, and
    the anode layer is electrically connected to the anode terminal, extends toward the cathode terminal, and is electrically isolated from the cathode terminal.

15. The solid-state battery according to claim 14, further comprising:
    a first insulating layer interposed between the cathode layer and the anode terminal; and
    a second insulating layer interposed between the anode layer and the cathode terminal.

16. A battery pack comprising:
    the solid-state battery according to claim 1;
    a control unit which controls operation of the solid-state battery; and
    a switch unit which switches operation of the solid-state battery according to an instruction of the control unit.

17. An electric motor vehicle comprising:
    the solid-state battery according to claim 1;
    a converting unit which converts power supplied from the solid-state battery into a driving force;
    a driving unit which is driven by the driving force; and
    a control unit which controls operation of the solid-state battery.

18. A power storage system comprising:
    the solid-state battery according to claim 1;
    at least one electrical device to which power is supplied from the solid-state battery; and
    a control unit which controls the supply of the power from the solid-state battery to the at least one electrical device.

19. An electric tool comprising:
    the solid-state battery according to claim 1; and
    a movable portion to which power is supplied from the solid-state battery.

20. An electronic device comprising:
the solid-state battery according to claim 1 as a power supply source.

\* \* \* \* \*